US010226037B2

(12) United States Patent
States, III et al.

(10) Patent No.: US 10,226,037 B2
(45) Date of Patent: Mar. 12, 2019

(54) FLUID DISPENSING DEVICE

(71) Applicant: Clarke Consumer Products, Inc., St. Charles, IL (US)

(72) Inventors: Robert G. States, III, Morrow, OH (US); Harbinder Singh Pordal, Mason, OH (US); David Andrew Parrott, Cincinnati, OH (US); Jeffrey Michael Akins, Liberty Township, OH (US); Anthony Kevin Magro, Fox River Grove, IL (US); Scott A. Lazar, Downers Grove, IL (US)

(73) Assignee: Clarke Consumer Products, Inc., St. Charles, IL (US)

( * ) Notice: Subject to any disclaimer, the term of this patent is extended or adjusted under 35 U.S.C. 154(b) by 0 days.

(21) Appl. No.: 15/081,328

(22) Filed: Mar. 25, 2016

(65) Prior Publication Data
US 2016/0279652 A1 Sep. 29, 2016

Related U.S. Application Data

(60) Provisional application No. 62/138,228, filed on Mar. 25, 2015.

(51) Int. Cl.
*B05B 15/63* (2018.01)
*A01M 21/04* (2006.01)
(Continued)

(52) U.S. Cl.
CPC ........ *A01M 21/043* (2013.01); *A01M 1/2033* (2013.01); *A01M 1/2038* (2013.01);
(Continued)

(58) Field of Classification Search
CPC ... B05B 7/2418; B05B 12/002; B05B 7/2405; B05B 7/241; B05B 7/2413;
(Continued)

(56) References Cited

U.S. PATENT DOCUMENTS 1,804,589 A 5/1931 Breuer
1,822,622 A 9/1931 Hermann
(Continued)

FOREIGN PATENT DOCUMENTS

EP 2 586 303 5/2013
WO WO 97/06882 2/1997

OTHER PUBLICATIONS

International Search Report and Written Opinion dated Aug. 8, 2016, for International Application No. PCT/US2016/024237, Applicant, Clarke Consumer Products, Inc. (26 pages).
(Continued)

*Primary Examiner* — Darren W Gorman
*Assistant Examiner* — Juan C Barrera
(74) *Attorney, Agent, or Firm* — McCracken & Gillen LLC

(57) ABSTRACT

According to one aspect, a fluid dispensing device comprises a housing and a fluid moving device associated with the housing. The housing includes an interior surface defining a passage extending at least between an emission end and at least one aperture configured to facilitate entry of a fluid into the passage. The housing further includes a mounting apparatus adjacent the aperture and adapted to receive a fluid source. The fluid moving device is operable to develop air flow in the passage, wherein the aperture is disposed downstream of the fluid moving device and upstream of the emission end.

18 Claims, 28 Drawing Sheets

(51) Int. Cl.
  *B65D 83/24* (2006.01)
  *B65D 83/14* (2006.01)
  *A01M 29/12* (2011.01)
  *A01M 25/00* (2006.01)
  *A01M 1/20* (2006.01)
  *B05B 7/00* (2006.01)
  *B65D 83/20* (2006.01)
  *A01G 13/06* (2006.01)
  *B05B 1/28* (2006.01)
  *B65D 83/38* (2006.01)

(52) U.S. Cl.
  CPC .......... *A01M 25/006* (2013.01); *A01M 29/12* (2013.01); *B05B 7/0075* (2013.01); *B05B 15/63* (2018.02); *B65D 83/202* (2013.01); *B65D 83/206* (2013.01); *B65D 83/24* (2013.01); *B65D 83/752* (2013.01); *A01G 13/065* (2013.01); *A01M 2200/01* (2013.01); *B05B 1/28* (2013.01); *B65D 83/384* (2013.01)

(58) Field of Classification Search
  CPC ... B05B 7/2416; B05B 7/2421; B05B 7/2491; B05B 15/63; B05B 7/0075; B05B 1/28; A01M 1/2033; A01M 1/2038; A01M 21/043; A01M 25/006; A01M 29/12; A01M 2200/01; B65D 83/14–83/759; B65D 83/205; B65D 83/20; B65D 83/202; B65D 83/203; B65D 83/24; B65D 83/30; B65D 83/303; B65D 83/384; B65D 83/386; B65D 83/75; A01G 13/065
  USPC ...... 239/8, 222.11, 434, 426, 152–154, 337; 222/162, 256–262, 645–648, 222/402.1–402.25, 173
  See application file for complete search history.

(56) References Cited

U.S. PATENT DOCUMENTS

| | | | |
|---|---|---|---|
| 1,881,569 A | 10/1932 | Hermann | |
| 2,569,759 A | 10/1951 | Hall | |
| 2,661,239 A | 12/1953 | Tirrell | |
| 3,197,142 A | 7/1965 | Gold et al. | |
| 3,200,535 A | 8/1965 | Hession, Jr. | |
| 3,392,479 A | 7/1968 | Simmons | |
| 3,429,483 A | 2/1969 | Micallef | |
| 3,506,195 A | 4/1970 | Waldrum | |
| 3,575,349 A | 4/1971 | Stahl et al. | |
| 3,589,570 A | 6/1971 | Gach | |
| 3,768,732 A | 10/1973 | Curtis et al. | |
| 3,993,250 A | 11/1976 | Shure | |
| 4,078,725 A | 3/1978 | Bauer | |
| 4,221,331 A | 9/1980 | Goran, Jr. | |
| 4,379,523 A | 4/1983 | Schanz et al. | |
| 4,523,080 A * | 6/1985 | Bolton ................... | A45D 20/12 132/212 |
| 4,591,096 A | 5/1986 | Snyder et al. | |
| 4,605,019 A | 8/1986 | Reynolds et al. | |
| 5,131,598 A | 7/1992 | Hoogeveen, Jr. | |
| 5,244,124 A | 9/1993 | Raffo | |
| 5,279,256 A * | 1/1994 | Brite ..................... | A01K 13/001 119/604 |
| 5,338,495 A | 8/1994 | Steiner et al. | |
| 5,346,132 A | 9/1994 | Hahn et al. | |
| 5,373,427 A | 12/1994 | McLean | |
| 5,549,220 A | 8/1996 | Whalen | |
| 5,613,625 A | 3/1997 | Specht | |
| 5,620,633 A | 4/1997 | Junkel et al. | |
| 5,667,731 A | 9/1997 | Junkel et al. | |
| 5,715,999 A | 2/1998 | Hsu | |
| 5,740,948 A | 4/1998 | Chu et al. | |
| 5,772,074 A | 6/1998 | Dial et al. | |
| 5,837,167 A | 11/1998 | Lederer | |
| 5,843,344 A | 12/1998 | Junkel et al. | |
| 6,003,787 A | 12/1999 | Fisher | |
| 6,006,957 A | 12/1999 | Kunesh | |
| 6,029,862 A | 2/2000 | Jones | |
| 6,092,260 A | 7/2000 | Kai | |
| 6,152,382 A | 11/2000 | Pun | |
| 6,216,961 B1 * | 4/2001 | Utter ..................... | B05B 7/0075 222/175 |
| 6,296,147 B1 | 10/2001 | Trocola et al. | |
| 6,361,752 B1 | 3/2002 | Demarest et al. | |
| 6,391,329 B1 | 5/2002 | Ito et al. | |
| 6,409,097 B1 | 6/2002 | McCauley | |
| 6,619,509 B2 | 9/2003 | DeKoning et al. | |
| 6,827,290 B2 | 12/2004 | Zimmerman | |
| 6,953,376 B1 | 10/2005 | Kim et al. | |
| 6,981,616 B2 | 1/2006 | Loghman-Adham et al. | |
| 7,021,571 B1 | 4/2006 | Lawson et al. | |
| 7,104,468 B2 | 9/2006 | Stengel | |
| D536,063 S | 1/2007 | Childs et al. | |
| 7,178,743 B2 | 2/2007 | Clarke, III et al. | |
| D568,961 S | 5/2008 | Childs et al. | |
| 7,478,766 B2 | 1/2009 | Clarke, III et al. | |
| 7,566,048 B1 | 7/2009 | Ptak | |
| 7,624,898 B2 | 12/2009 | Hornsby et al. | |
| 7,681,806 B2 | 3/2010 | Triplett et al. | |
| D613,821 S | 4/2010 | Childs et al. | |
| 7,744,833 B2 | 6/2010 | Varanasi et al. | |
| 7,775,459 B2 | 8/2010 | Martens, III et al. | |
| 7,837,065 B2 | 11/2010 | Furner et al. | |
| 8,413,911 B2 | 4/2013 | Munn | |
| 8,584,971 B2 | 11/2013 | Seabase et al. | |
| 8,807,455 B2 | 8/2014 | Havlovitz et al. | |
| 8,894,044 B2 | 11/2014 | Furner et al. | |
| 2003/0218029 A1 | 11/2003 | Brody | |
| 2005/0284951 A1 | 12/2005 | Clarke, III et al. | |
| 2005/0284958 A1 * | 12/2005 | Clarke, III ............ | B05B 7/2416 239/304 |
| 2009/0121047 A1 | 5/2009 | Ptak | |
| 2011/0068187 A1 * | 3/2011 | Sides ..................... | B05B 5/03 239/3 |
| 2013/0020350 A1 | 1/2013 | Gordos et al. | |
| 2013/0175363 A1 | 1/2013 | Dobias et al. | |
| 2014/0014740 A1 | 1/2014 | Sands et al. | |
| 2014/0078857 A1 | 3/2014 | Nelson et al. | |
| 2014/0183280 A1 | 7/2014 | Mafi et al. | |

OTHER PUBLICATIONS

International Preliminary Report on Patentability dated Oct. 5, 2017, for International Application No. PCT/US2016/024237, Applicant, Clarke Consumer Products, Inc. (10 pages).

* cited by examiner

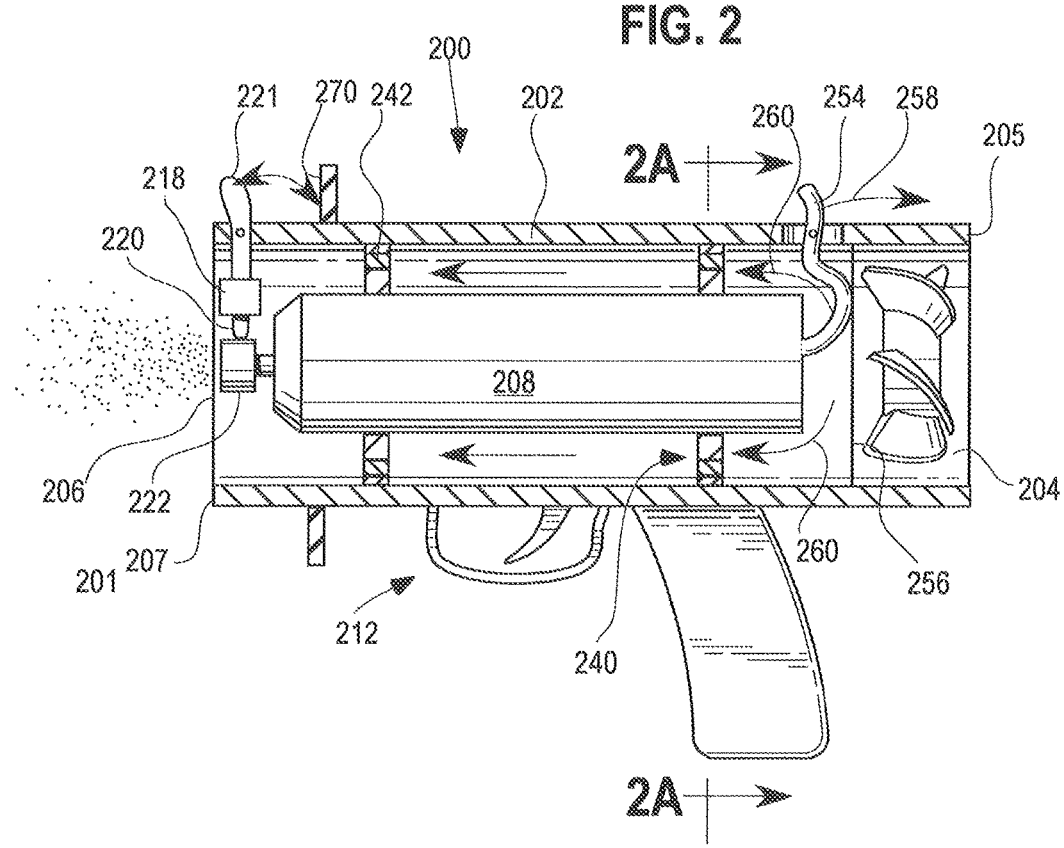

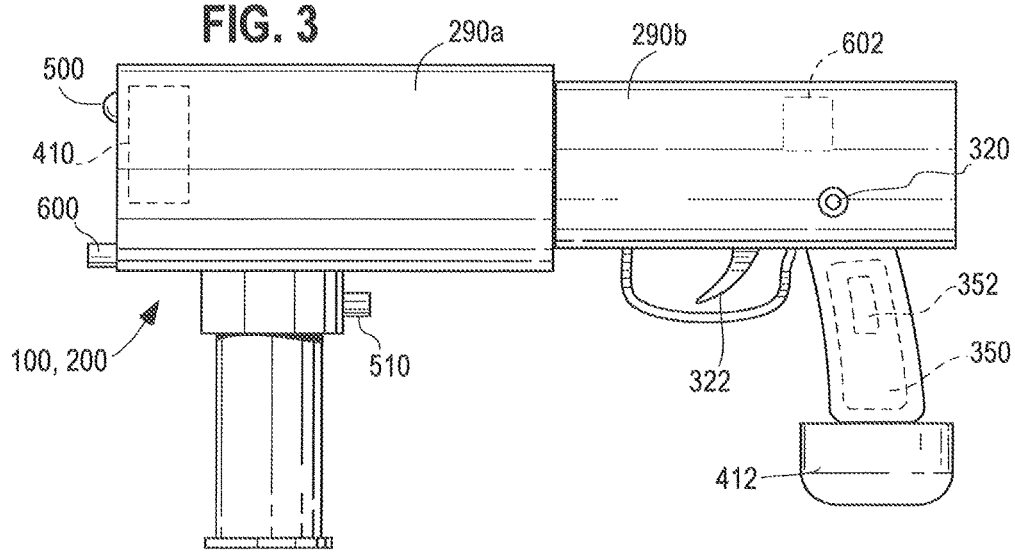
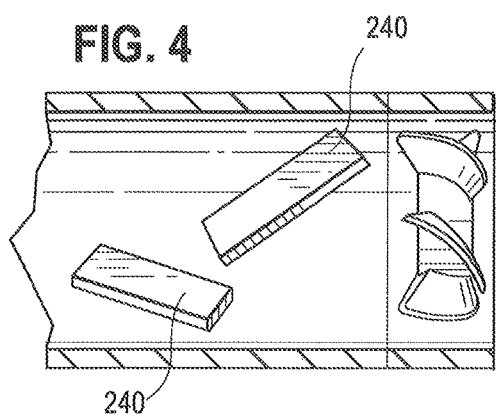
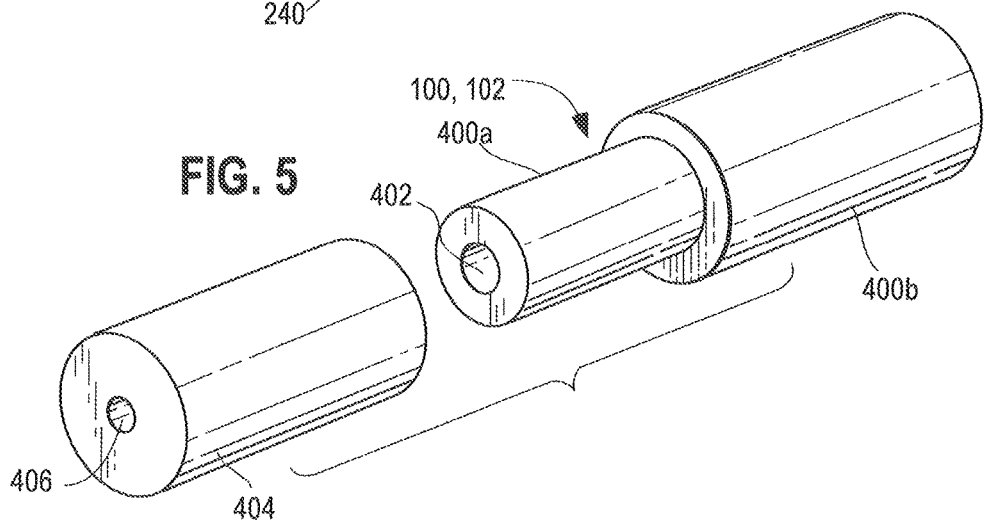

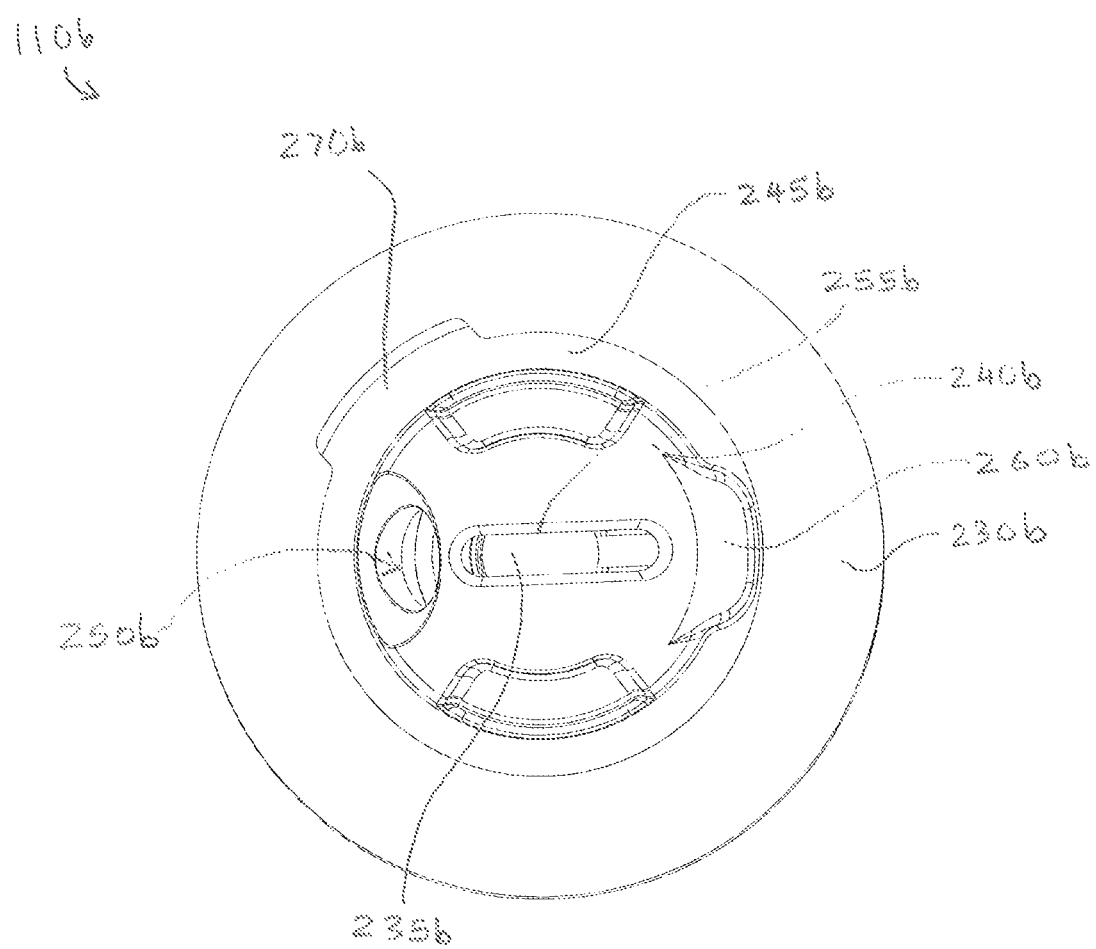

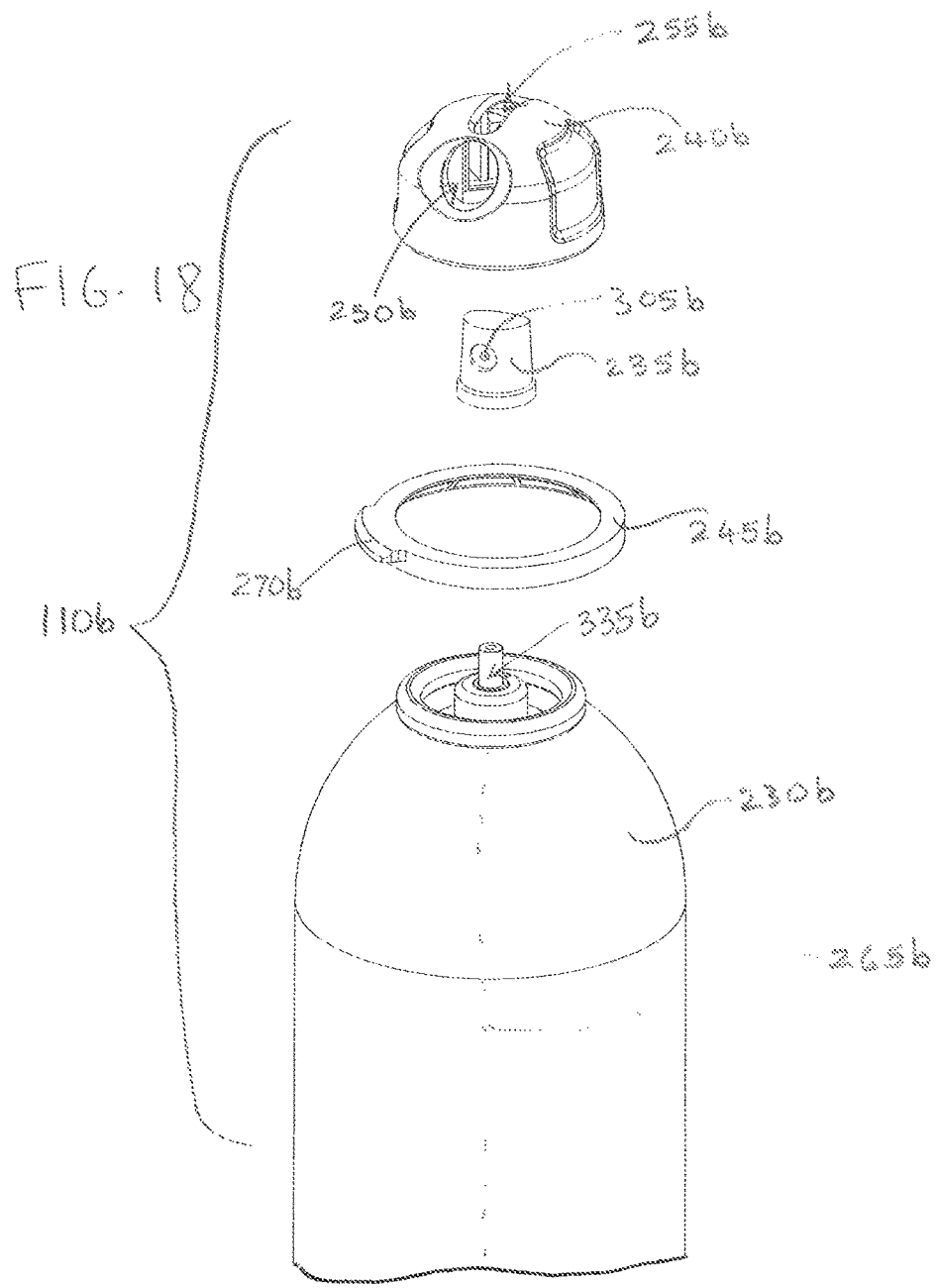

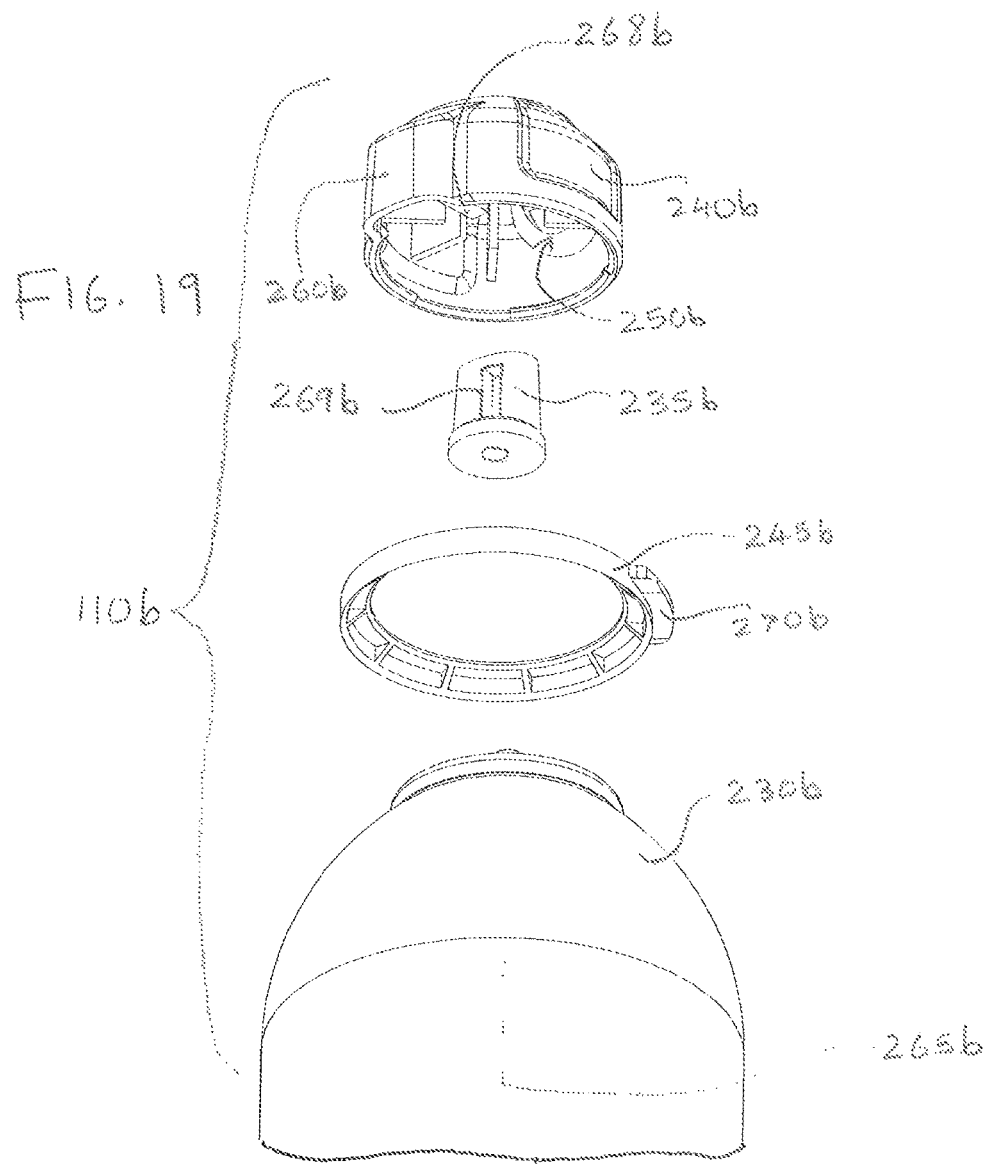

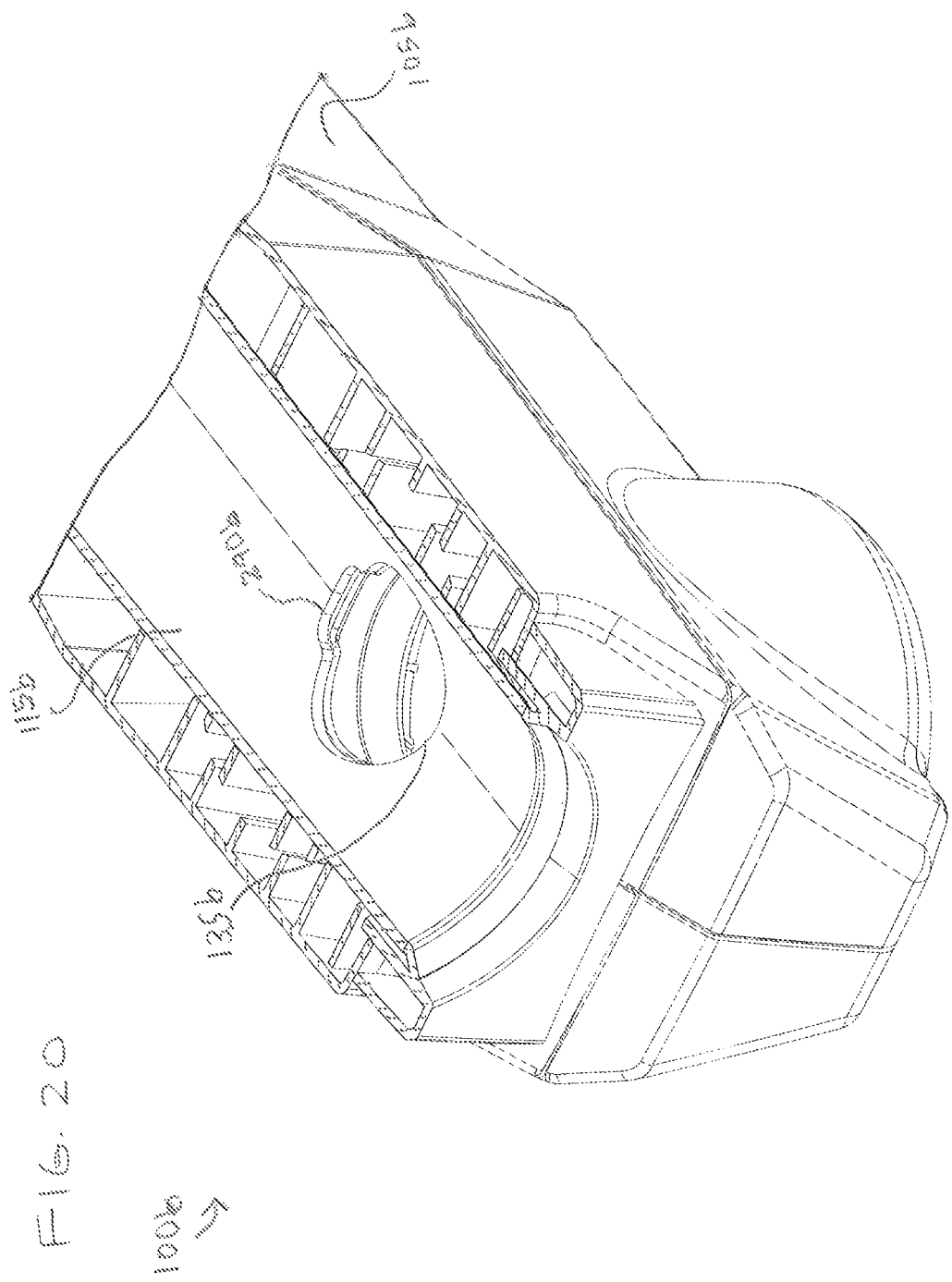

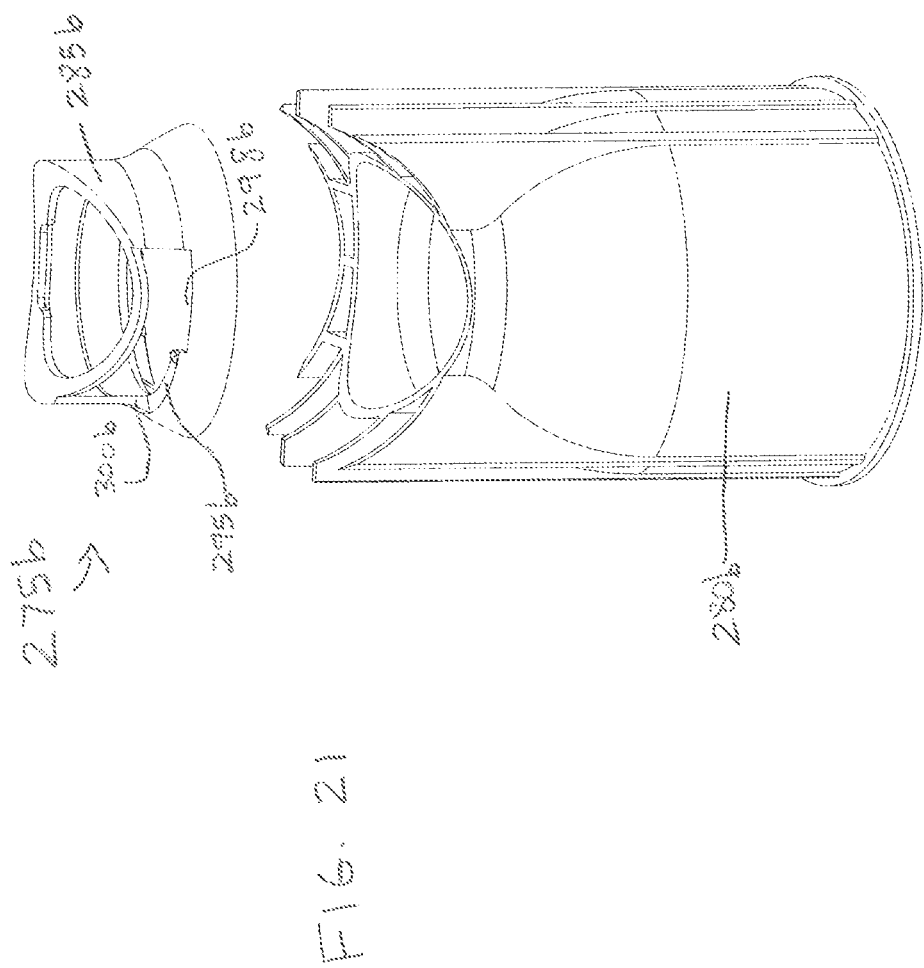

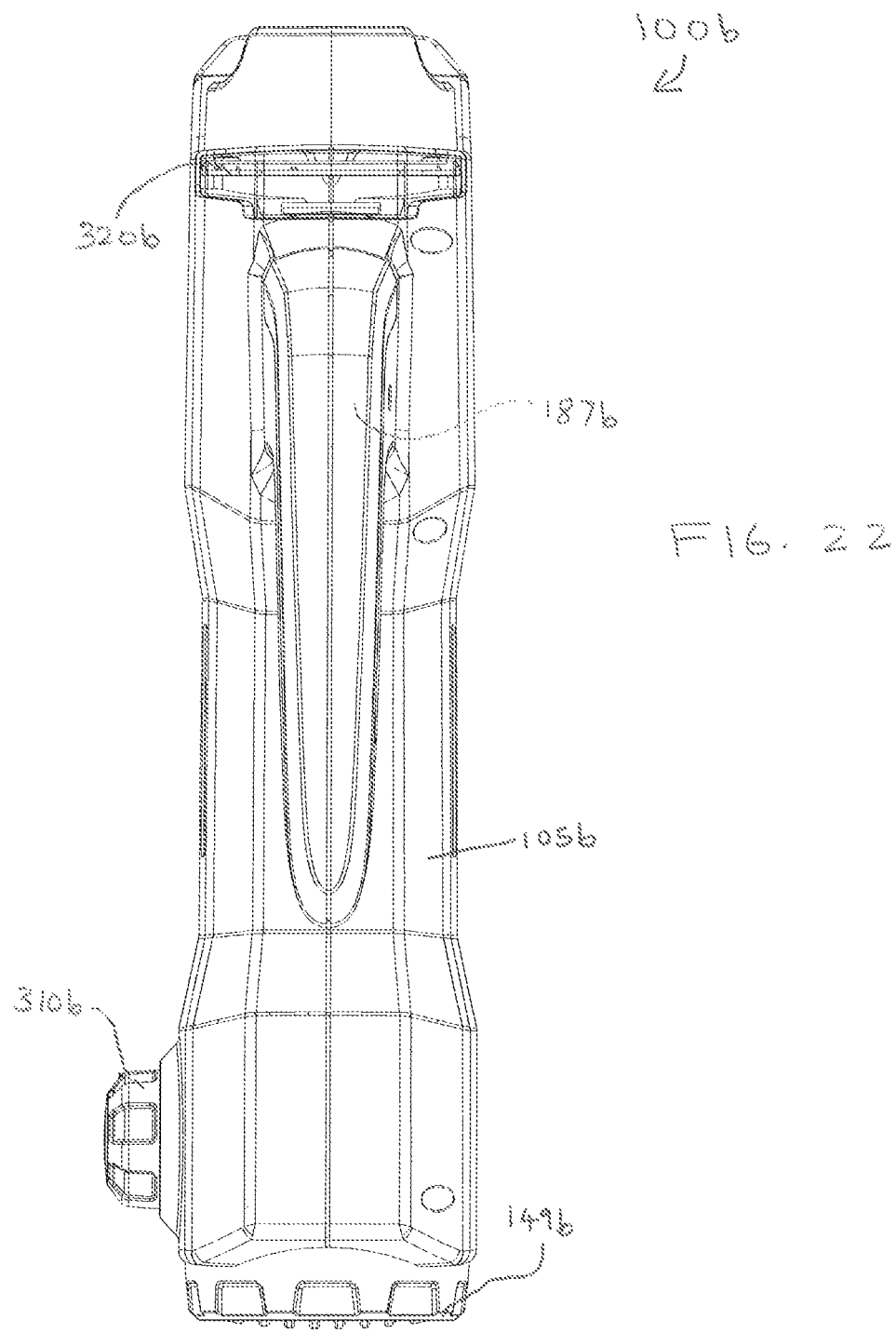

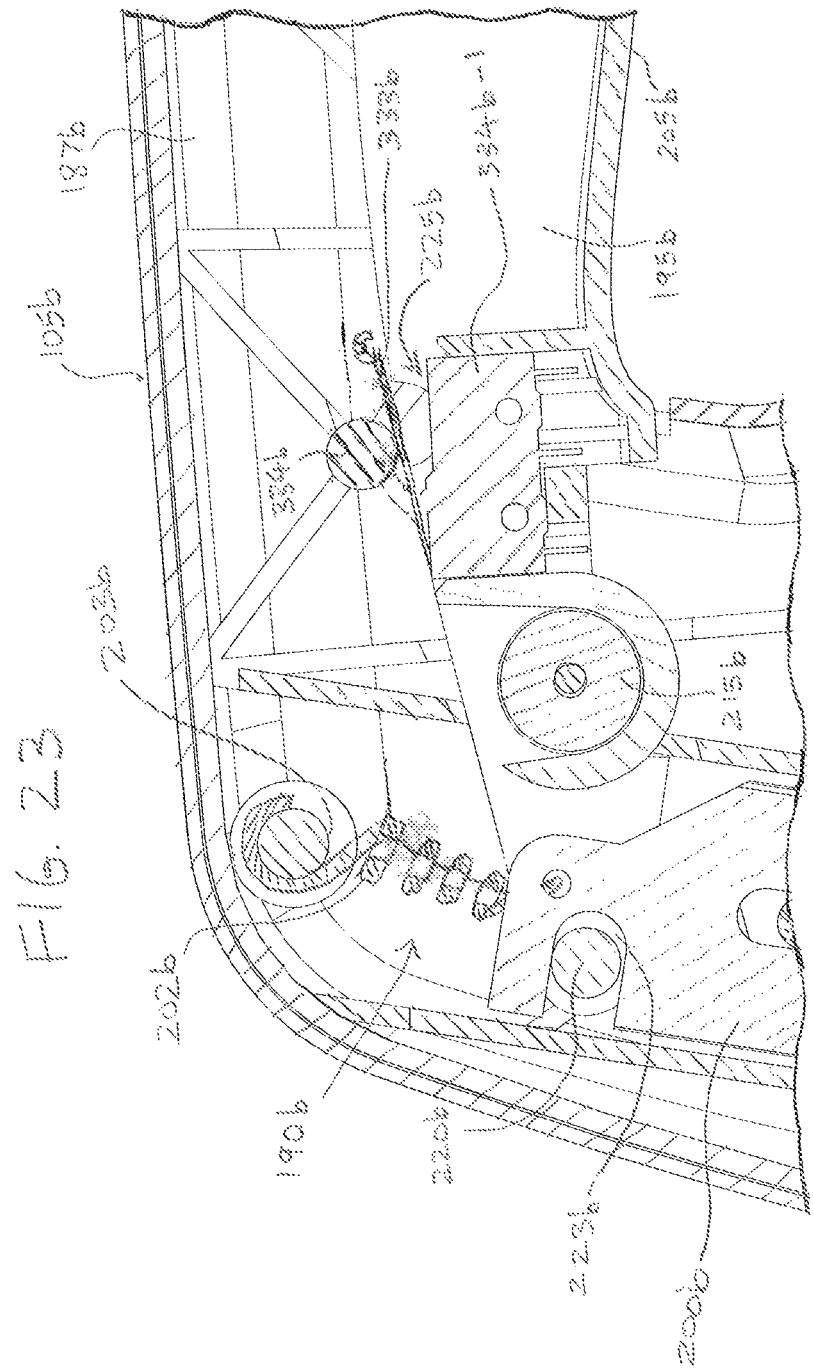

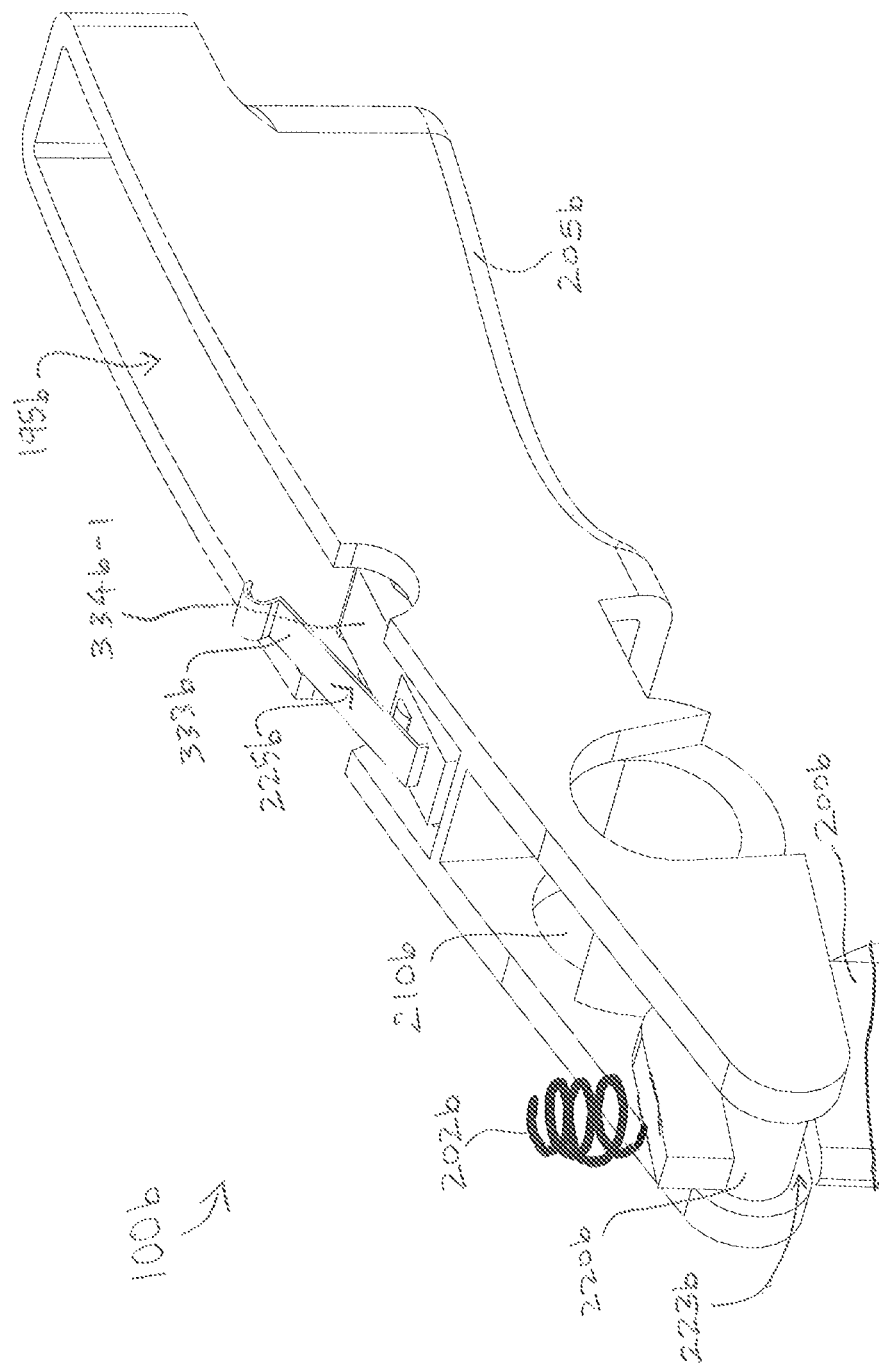

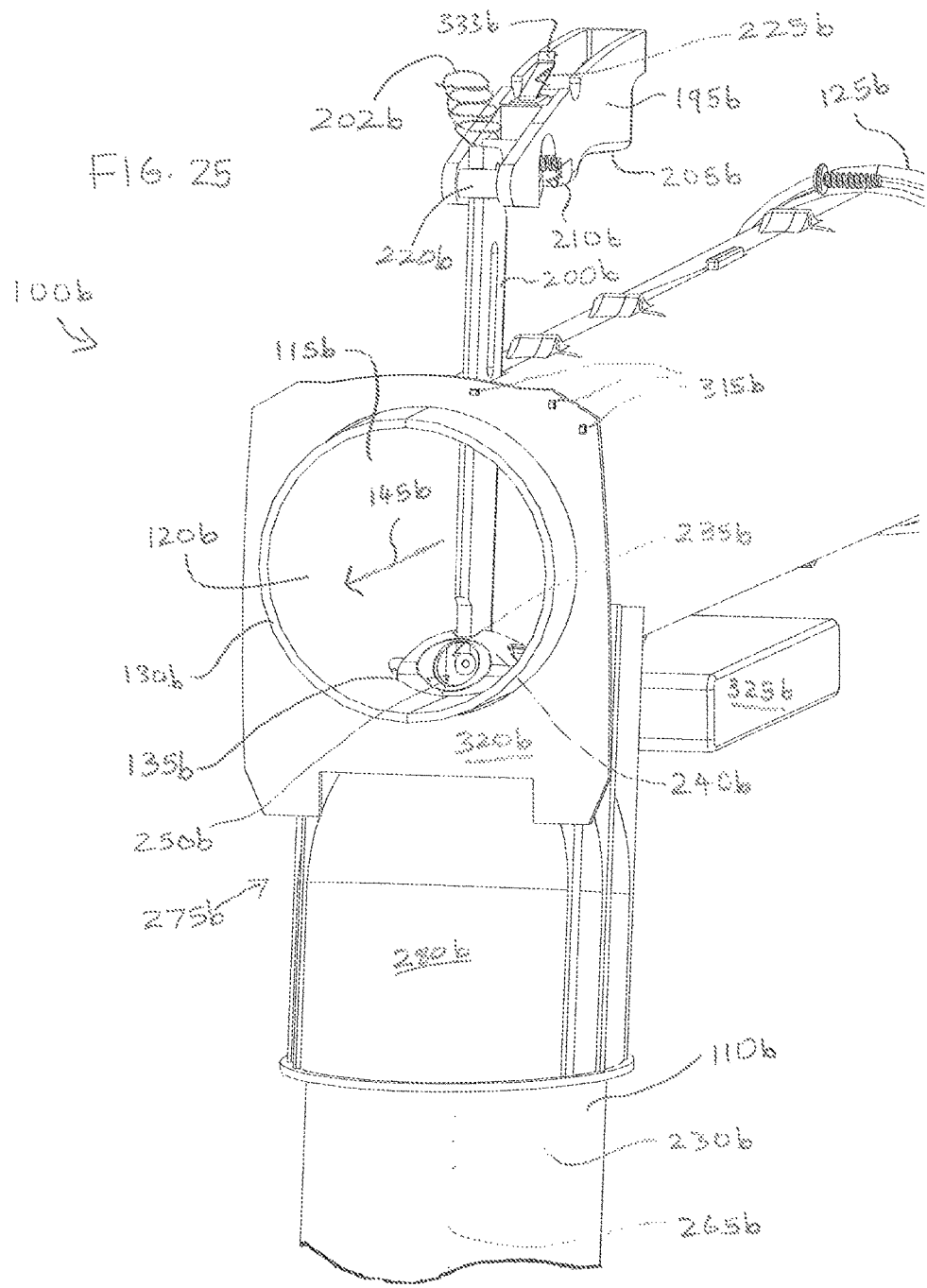

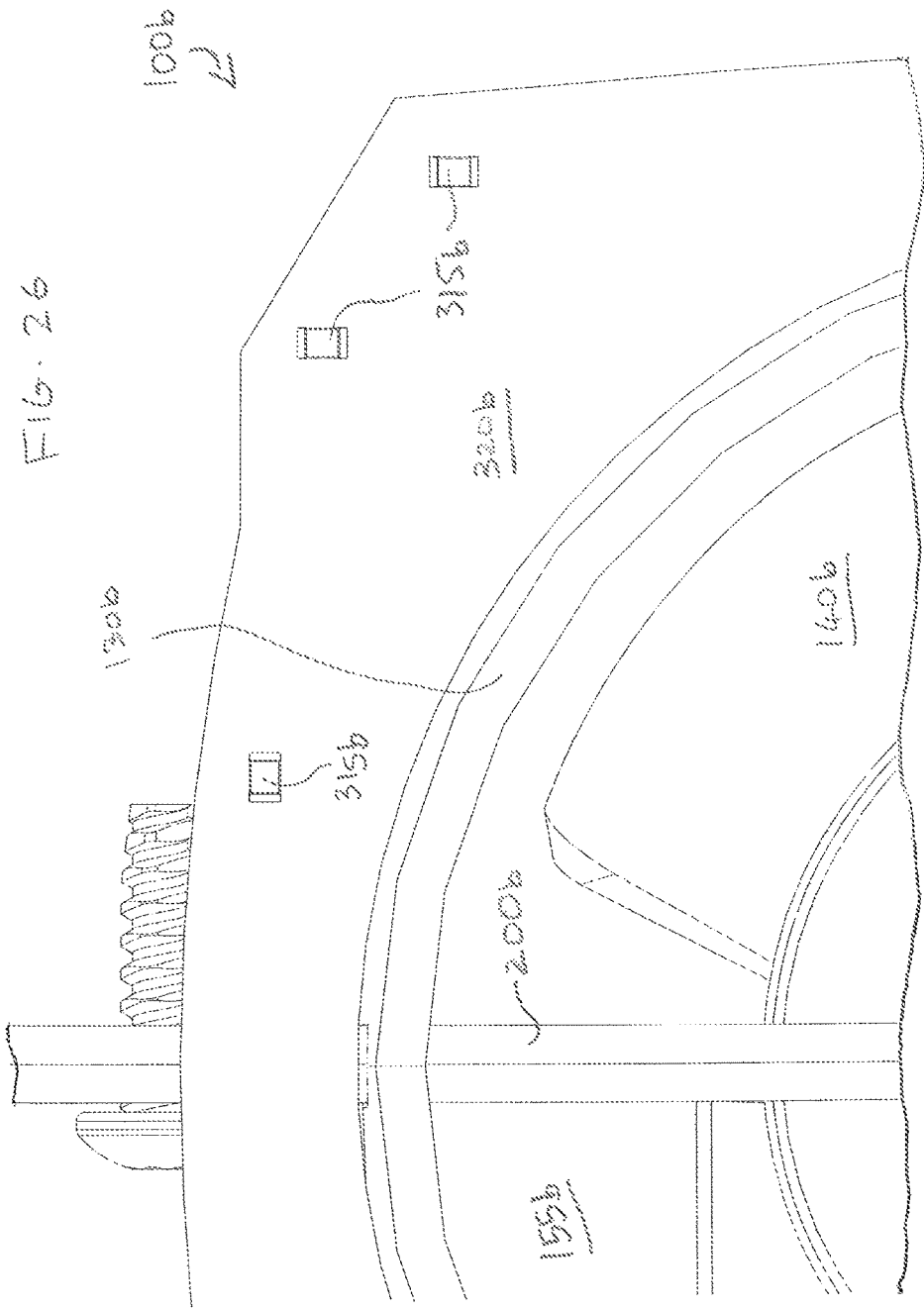

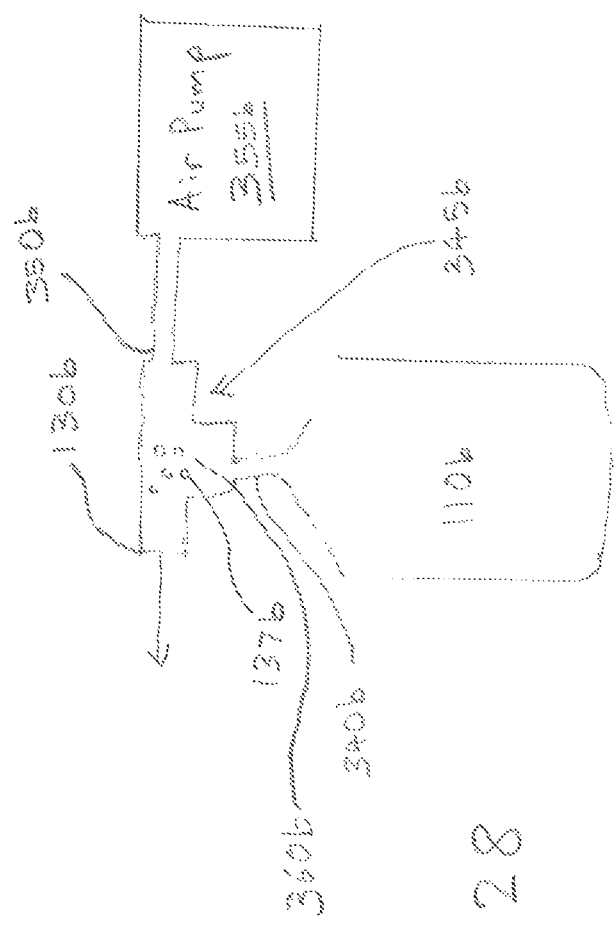

FLUID DISPENSING DEVICE

CROSS REFERENCE TO RELATED APPLICATIONS

The present application claims the benefit of U.S. Provisional Patent Application No. 62/138,228, filed Mar. 25, 2015, entitled "Fluid Dispensing Device", the disclosure of which is hereby incorporated by reference herein.

FIELD OF DISCLOSURE

The present subject matter relates to dispensing devices, and more particularly, to a device for dispensing a fluid.

BACKGROUND

Dispensers have been developed for emitting a fluid into ambient surroundings. For example, spray or misting devices are often used to dispense a variety of fluids, such as insecticides/pest repellants, cleaning solutions, fertilizers, etc. Such devices may be manually operable, motor-operated, or a combination of the two. Fluid dispensing devices typically use a pressurized source of fluid. Often, the fluid is pressurized by an apparatus, such as a pump, disposed in the device.

Dispensers that are particularly adapted for use in outdoor applications are typically used to spray or otherwise eject amounts of fluid, often over a large area. Because it is usually the case that a fluid must be selectively applied to some surfaces and not others, there is a need to control emission characteristics, such as flow magnitude and distribution, so that unintended overspray is minimized. Compounding this issue is the effect of moving air (i.e., wind) on the emission flow, which can undesirably alter the desired distribution, and can result in deposition of fluid on one or more surfaces that are not intended to receive fluid. Alternatively, one may wish to use wind to assist in the dispersion of fluid. Thus, for example, one may spray upwind and allow the dispersed material to drift onto surfaces.

The need to control emission characteristics carefully has, in the past, led to the use of complex and expensive components. This was especially the case when liquids were to be dispensed in residential areas, where particular care had to be taken to prevent contamination of on-site and off-site areas. Accordingly, particularly in the case where relatively large amounts of liquids were to be dispensed in an outdoor setting, such dispensing devices have been complex and difficult to use, and expensive to purchase and operate.

SUMMARY

According to one aspect, a fluid dispensing device comprises a housing and a fluid moving device associated with the housing. The housing includes an interior surface defining a passage extending at least between an emission end and at least one aperture configured to facilitate entry of a fluid into the passage. The housing further includes a mounting apparatus adjacent the aperture and adapted to receive a fluid source. The fluid moving device is operable to develop air flow in the passage, wherein the aperture is disposed downstream of the fluid moving device and upstream of the emission end.

According to another aspect, a fluid dispensing device comprises a housing and a handle associated with the housing. The housing includes an interior surface defining a passage extending at least between an emission end and at least one aperture configured to facilitate entry of a fluid into the passage. The handle is disposed above the interior surface and the aperture is disposed along a bottom portion of the interior surface According to yet another aspect, a method of dispensing fluid comprises providing fluid to a passage defined by an interior surface of a device housing of a fluid dispensing device. The passage includes an emission end and at least one aperture. The aperture is configured to receive the fluid from a source of fluid and the device housing further includes a mounting apparatus adjacent the aperture. The method further comprises operating a fluid moving device associated with the device housing. The fluid moving device is disposed upstream of the aperture and the emission end is disposed downstream of the aperture.

According to yet another aspect, a container for fluid comprises a container housing, a button atop the container housing, an overcap at least partially enclosing the button, and a fitting member disposed at least partially circumferentially about the container. The overcap comprises an orifice to allow flow of the fluid and an aperture for facilitating actuation of the button. The overcap further comprises a projecting member.

BRIEF DESCRIPTION OF THE DRAWINGS

FIG. 2 is a view similar to FIG. 1A illustrating another embodiment of a fluid dispensing device;

FIG. 2A is a sectional view taken generally along the lines 2A-2A of FIG. 2;

FIG. 3 is a side elevational view of a telescoping housing;

FIG. 4 is a fragmentary sectional view of a housing having vanes therein;

FIG. 5 is an exploded isometric view of a housing nozzle with an extension tube;

FIG. 17 is a plan view of the container of FIG. 11;

FIG. 18 is a fragmentary, exploded, isometric view of the container of FIG. 11 taken from above;

FIG. 19 is a fragmentary, exploded, isometric view of the container of FIG. 11 taken from below;

FIG. 20 is a fragmentary, enlarged, isometric cross sectional view taken generally along lines 20-20 of FIG. 12, illustrating the fluid dispensing device without the container;

FIG. 21 is an enlarged, exploded, isometric view of a mounting apparatus of the fluid dispensing device of FIG. 8;

FIG. 22 is a plan view of the embodiment of FIG. 8;

FIG. 23 is a fragmentary, enlarged, cross sectional view taken generally along lines 14-14 of FIG. 12, illustrating a portion of an actuator of the fluid dispensing device of FIG. 8;

FIG. 24 is a fragmentary, enlarged, isometric view of a portion of the actuator of the fluid dispensing device of FIG. 8, without the device housing of the fluid dispensing device;

FIG. 25 is an isometric view of the fluid dispensing device of FIG. 8 without the device housing thereof;

FIG. 26 is an enlarged, fragmentary, front elevational view of the fluid dispensing device of FIG. 8 without the device housing thereof;

FIG. 28 is a schematic diagram of an alternative pump system used in conjunction with any of the fluid dispensing devices disclosed herein, including the fluid dispensing device of FIGS. 8-27.

DETAILED DESCRIPTION

A number of embodiments of a fluid dispensing device are disclosed herein. An embodiment of a fluid dispensing device includes structural components that together perform functions for a variety of applications. A fluid dispensing device may include, among other things, a housing, a fluid moving device (otherwise referred to as a forced-fluid mechanism), a fluid storage unit, and a fluid delivery control mechanism. For example, the forced-fluid mechanism may be a fan; the fluid storage unit may be a pressurized fluid storage container; and the fluid delivery control mechanism may be an actuator trigger element that enables delivery of fluid through and out the housing. It is disclosed herein that the embodiments of the fluid dispensing device produce and propel fine particles/droplets in a form of a spray mist or fog a distance away from a user of the fluid dispensing device. By propelling the fine particles a distance away from the user, the probability of blow-back onto the user is minimized. Other advantages are realized as noted in greater detail below.

Figure 1:
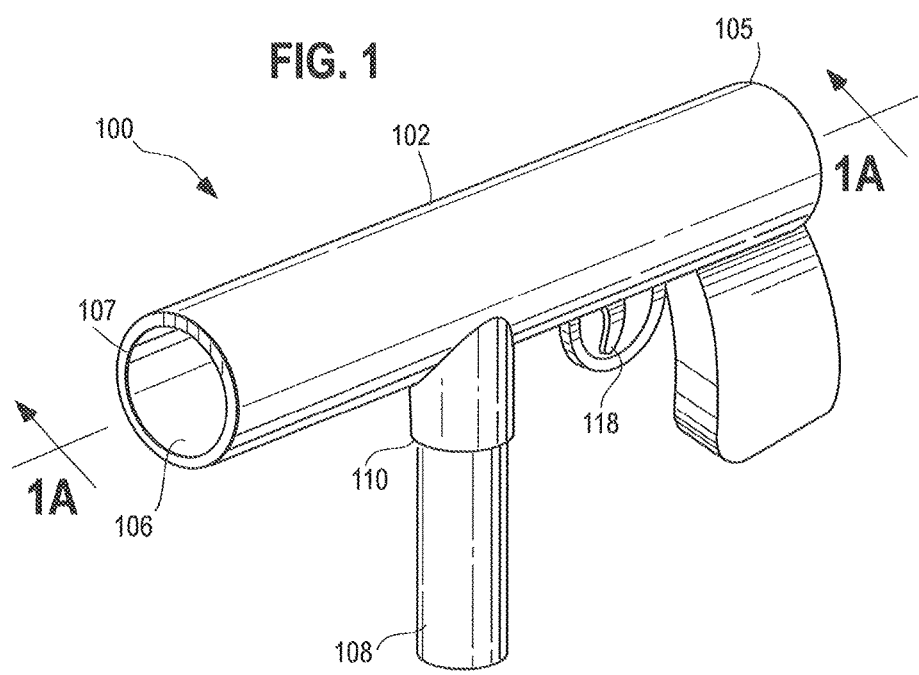
FIG. 1 is an isometric view of a first embodiment of a fluid dispensing device.
Figure 1A:
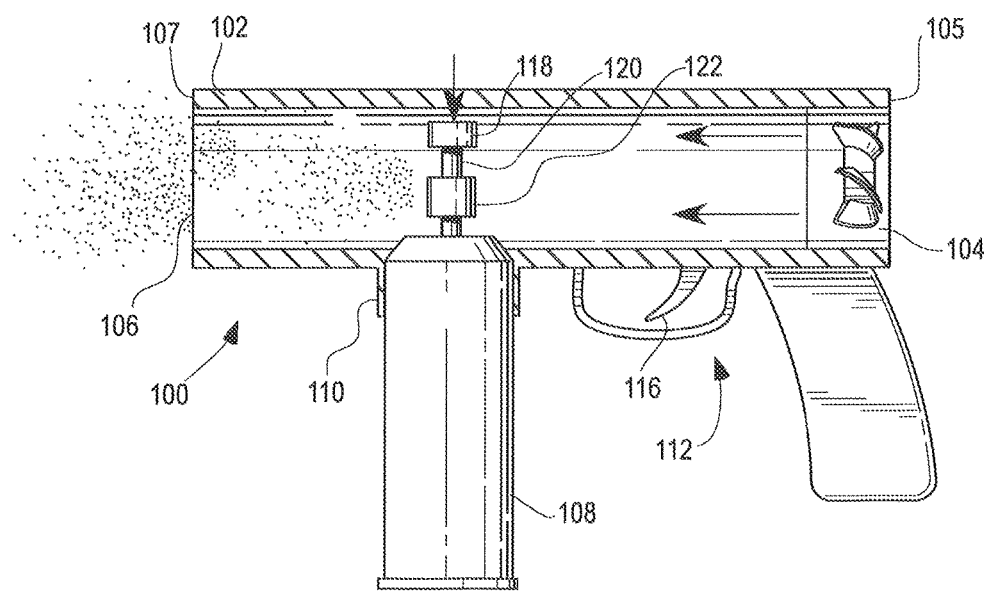
FIG. 1A is a partial sectional view of the fluid dispensing device taken generally along the lines 1A-1A of FIG. 1.

Referring to FIGS. 1 and 1A, a first embodiment of a fluid dispensing device 100 includes a hollow housing 102, a fan 104 disposed inside or outside the housing 102, for example, at a first end 105 of the housing, a spray orifice 106 located at an intermediate portion of the housing 102 or at an emission end 107 opposite the first end 105, and a container 108 in fluid communication with the housing 102 and coupled thereto by a mounting device 110 and operable by an actuator 112. An interior surface of the housing 102 (as well as other housings disclosed herein) may be substantially cylindrical; however, the interior surface of the housing may be of other shapes, or combination of shapes, to be ergonomic and efficiently accommodate and conform to the shape and/or function of the other elements, such as the fan 104, the container 108, the mounting device 110, and the actuator 112. An exterior surface of the housing may be of any shape. Any of the housings disclosed herein may be made of plastic, metal, or other material or combination of materials depending on the application. For example, the housing 102 may have a corrosion resistant coating thereon to protect the housing and extend the life of the fluid dispensing device 100.

In the illustrated embodiment of FIGS. 1 and 1A, the fan 104 is disposed behind the container 108 and the fan 104 directs air flow toward the container 108. The air flow continues past the spray orifice 106 of the container 108 and droplets of fluid from the container 108 are selectively discharged into the air flow by a user depressing a trigger 116 or other operable element of the actuator 112. Specifically, the trigger 116 is operatively coupled electrically, electromechanically, or by a mechanical linkage to a solenoid 118 or other device that moves a plunger 120 disposed in engagement with a spray button 122 of the container 108. Depressing the trigger 116 actuates the solenoid 118 so that the spray button 122 is depressed by the plunger 120, thereby opening a valve of the container 108 and allowing the pressurized fluid to escape therefrom. Preferably, although not necessarily, the rotational axis of the fan 104 and the spray orifice 106 of the spray button 122 are aligned with a longitudinal central axis of the housing 102 (this also preferably, although not necessarily, the case in other embodiments disclosed herein). If desired, the fan 104 may be operated continuously or discontinuously with depression of the trigger 116. As noted in greater detail hereinafter, the sizes of the air droplets are controlled in dependence upon the type of fluid being dispensed. The air with fluid droplets entrained therein continues out the emission end 107.

In the embodiments disclosed in FIGS. 1-7, the container 108 may include features, such as on a body thereof or on an overcap secured thereto, that rotatably interlock into complementary features carried by the housing 102 to align and lock the container 108 in proper relation relative to the housing 102. The interlocking features may comprise interlocking cam surfaces with a stop that accurately positions a nozzle of the container 108, a bayonet mount, inter-engaging threads on the container 108 and the housing 102 wherein the threads are configured such that the nozzle of the container is accurately positioned when the threads are tight, two or more clamps carried by the housing that grip and retain the container with the nozzle thereof accurately positioned, a structure similar or identical to a hydraulic or pneumatic fitting, again with a positioning device to accurately position the nozzle, or any other suitable structures.

FIGS. 6 and 7 illustrate modifications to the embodiment of FIGS. 1 and 1A. The device 100 includes a C-shaped housing 102*a* in lieu of the linear housing 102. In particular, the housing 102*a* includes portions or legs 102*a*-1, 102*a*-2, and 102*a*-3. At least the legs 102*a*-1 and 102*a*-2 are hollow to allow the passage of air therethrough. The fan 104 may be disposed in either of the legs 102*a*-1, 102*a*-2, and an intake vent 103 may be disposed at a bottom portion 102*a*-2*a* of the leg 102*a*-2. The intake vent 103 is so located so as to be disposed away from the hair of a user. The leg 102*a*-3 is bifurcated into two laterally spaced portions 102*a*-3*a* and 102*a*-3*b*. The container 108 is aligned and retained on or in the housing 102*a* as in the embodiment of FIGS. 1 and 1A, i.e., by interlocking features at a top portion of the container 108. In this arrangement, a bottom portion of the container 108 is disposed between the laterally spaced portions 102*a*-3*a* and 102*a*-3*b* and may rest on an optional support surface disposed between the portions 102*a*-3*a* and 102*a*-3*b*. Alternatively, locking of the container 108 in position and/or proper alignment of the spray direction and proper operation may be effectuated by suitable structures disposed in engagement with the top and/or bottom of the container 108, as opposed to the just the top of the container 108. Thus, for example, the container may be fitted to the device 100 by tilting the top of the container toward the leg 102*a*-1, inserting the top of the container 108 into the housing 102*a*, rotating the container 108 until a surface on an actuating cap of the container 108 contacts a stop in the housing 102*a* so that the spray orifice 106 of the spray button (not seen, but located within the overcap) is aligned with a longitudinal central axis of the leg 102*a*-1, and raising a pivoting support and locking surface 105 (FIG. 7) upwardly into engagement with the bottom of the container 108 between the portions 102*a*-3*a* and 102*a*-3*b* to capture the container 108 between the leg 102*a*-1 and the support and locking surface 105 with the container 108 supported by the surface 105.

In use a user loads the container 108 into the device 100, grasps the leg 102*a*-2, and depresses the trigger 116, which is disposed in the leg 102*a*-2. The leg 102*a*-2 may include features forming a grip. The operation is otherwise the same as disclosed with respect to the embodiment of FIGS. 1 and 1A.

The modifications illustrated in FIGS. 6 and 7 result in a device having a relatively even front-to back weight distribution, particularly when one factors in the weight of one or more rechargeable batteries discussed hereinafter, which may be mounted below the leg 102*a*-2.

Referring to FIG. 2, another embodiment of a fluid dispensing device 200 incorporates a container 208 partially or fully within a housing 202. In this embodiment, the container 208 typically is operated when disposed in approximately horizontal position, and hence, the container 208 must have a valve arrangement that can be used in such position. Further, the spray direction of the container 208 is axial and the valve arrangement of the container 208 is actuable from the side in the illustrated embodiment, although a container employing other spray and actuation directions could be used. The container 208 is contrasted with the container 108 of the first embodiment, which is operable when disposed in approximately a vertical position, and which employs a different valve arrangement that is actuable by an axial force. The housing 202 is preferably sized to accommodate at least a part of the container 208, and further may be sized to provide a passage or passages for air flow developed by a fan 204 past the portion of the container 208 disposed in the housing 202. The fan 204 may be identical to or different than the fan 104. Thus, in the example of FIG. 2, the container 208 is disposed fully within the housing 202 and has an outer dimension less than an inner dimension of the walls of the housing 202 so that a space surrounds the container 208. In the illustrated embodiment of FIG. 2, two or more spaced holding members 240, 242 are disposed in the housing 202 and hold the container 208 in position therein. Specifically, referring to FIG. 2A, the holding members 240, 242 are identical, and hence, only the holding member 240 is described in detail herein. The holding member 240 includes inner and outer annular rings 244, 246 interconnected by radially extending connection members 248. The inner ring 244 is preferably resilient and deformable and has an inner diameter slightly less than an outer diameter of the container 208. The outer ring 246 may be rigid and has an outer diameter approximately equal to an inner diameter of the housing 202. The outer ring 246 is secured to an inner surface of the housing 202 at a desired axial location in any suitable manner, such as adhesive, a mechanical fastener, or both. The radially extending connection members 248 are of limited circumferential extent and the inner and outer rings are of limited radial extent to define air flow passages 250 therebetween.

Referring again to FIG. 2, the device 200 is prepared for use by loading the container 208 in the housing 202. A solenoid 218 having an actuating plunger 220 is pivotably mounted to a lever 221 that can be rotated approximately 90 degrees clockwise relative to the position shown in FIG. 2. The container 208 is then inserted into the housing 202 with the valve pointing to the left as seen in such FIG. Inner surfaces of the inner rings of the holding members 240, 242 are engaged by and are deformed outwardly by the somewhat larger diameter of the container 208. The differences in diameter of the container 208 and the inner surfaces of the holding members 240, 242 are such as to allow the container 208 to be slid past the holding members 240, 242, but allow the container 208 to be securely maintained in the housing 202 by the resilient portions of the holding members 240, 242. The container 208 is inserted into the housing 202 until the container 208 contacts a release lever 254 and the release lever 254 contacts a stop surface 256, whereupon the container 208 is disposed at a fully loaded position. The various elements are sized such that the valve of the container 208 is disposed at a proper axial position within the housing 202 when the container 208 is disposed at the fully loaded position. The solenoid 218 and plunger 220 are then rotated approximately 90 degrees counterclockwise to an operating position by moving the lever 221 a like amount. The lever 221 preferably can be locked in the operating position.

In use, the fan 204, which is disposed behind the container 208, is actuated to induce air flow toward the container 208. The air flow travels through the air flow channels 250 and around the container 208 and past a nozzle 222 thereof. The user may selectively depress a trigger 216 or other operable element of an actuator 212 operatively connected electrically, electromechanically, or by a mechanical linkage to the solenoid 218 to extend the plunger 220 into engagement with the nozzle 222 to actuate the container valve and cause droplets of fluid to be discharged into the air flow. The actuator 212 may be similar to the actuator 112 of the previous embodiment, with modifications to account for the different positioning of the container 208. As in the previous embodiment, the fan 204 may be operated only when the trigger 216 is depressed or may be continuously operated when the device 200 is powered on. The air flow with droplets entrained therein exits the housing 202 at an emission end 207. Other features, construction, and/or operation of the device 200 may be similar or identical to the features, construction, and/or operation of the device 100. Thus, for example, the housing 202 may be made of any suitable material and may be of any desired size and shape, the fan may be of any suitable type, as noted below, the container may be of any suitable shape and construction, etc. as in the first embodiment.

When it is desired to remove the container 208 from the housing 202, the lever 221 is unlocked and the release lever 254 is rotated in the direction of the arrow 258, causing an engagement portion 260 of the release lever 254 to exert force on the container to the left as seen in FIG. 2. The size, shape, and position of the release lever 254 is such that, when the lever 254 is rotated in this manner, the container 208 is ejected past the solenoid 218 and the plunger 218, which move out of the way, and at least a portion of the container extends outwardly past the emission end 207 of the housing, whereupon the user may grasp and remove the container 208 from the housing 208 fully.

Figure 6:
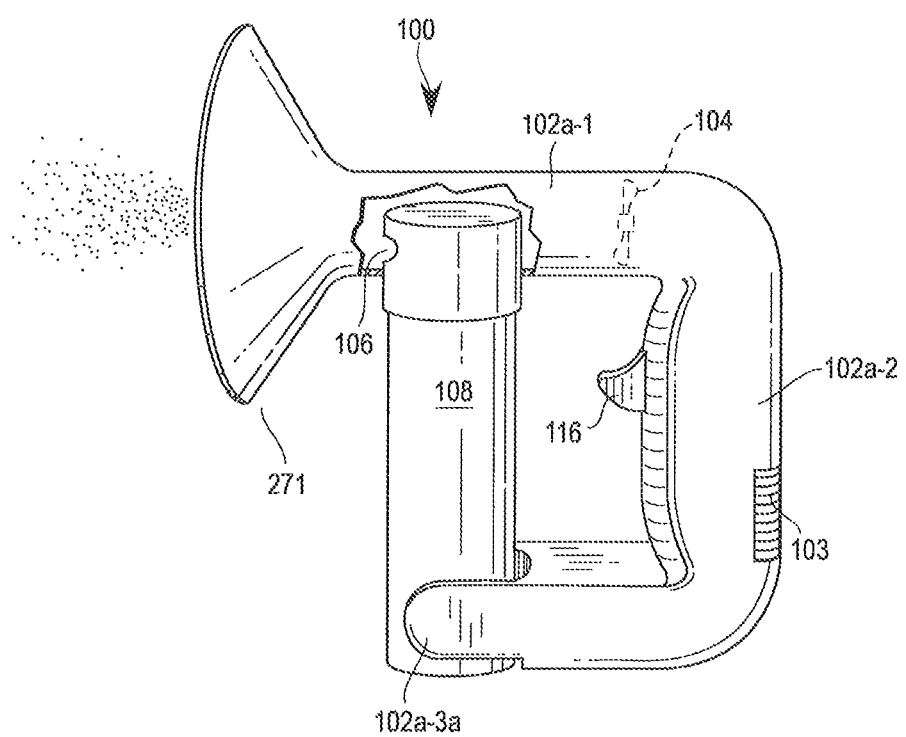
FIG. 6 is an isometric view of a modification of the embodiment of FIGS. 1 and 1A.
Figure 7:
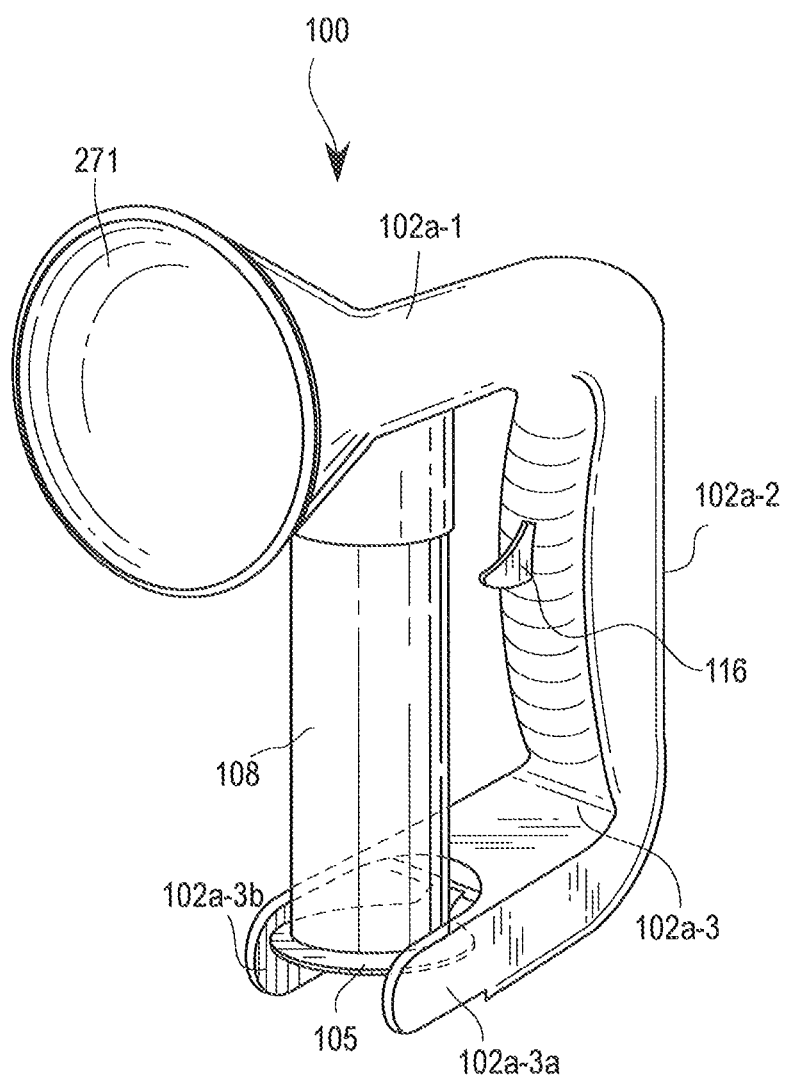
FIG. 7 is a side elevational view, partially in section, of the modified embodiment of FIG. 6.

In the embodiments of FIGS. 1-7, the housing may have an integral or separate outwardly facing shield section, for example, as illustrated by the section 270 of FIG. 2, that intercepts droplets that are traveling toward a user, for example, under the influence of wind. The shield section 270 may fully or partially surround the housing 202 and may be continuous or may comprise discontinuous portions. If desired, the shield section 270 may comprise a flared exit surface 271, for example as seen in FIGS. 6 and 7. Further, the embodiments disclosed in FIGS. 1-7 may include a telescoping section or sections, for example, as illustrated by the sections 290a, 290b of FIG. 3, which allow the housing to be extended such that the point of emission of the fine droplets is a farther distance away from the user so that the possibility of the user being contacted by droplets is further reduced. Moreover, the inclusion of a telescoping section or sections permits the fluid dispensing device to be collapsed to a retracted position for convenient storage.

Any of the embodiments disclosed in FIGS. 1-7 may include one or more optional features, such as a flow indicator, a control circuit, a rechargeable battery for supplying power to the fan and other optional components, and the like.

Fan

In the above-mentioned embodiments of the fluid dispensing device, the fan 104 or 204 may be used to propel fine particles of a fluid out of the housing. The fan 104 or 204 may be positioned within the housing or it may be placed externally at one end of the housing to provide forced air from the one end to the emission end. An external fan may be disposed in a fan housing. The fan may be of any type, for example, including a type with one or more fan blades or an axial or radial impeller, or may comprise an inductor fan. One or more stationary or movable vanes 240 may be provided in the housing 102 as seen in FIG. 4 to guide the air propelled by the fan 104 or 204 as the air travels through the housing 102, 202. The vanes 240 may be planar and/or curved. Forced air helps counteract effects of wind on fluid emission direction and helps the user to direct emission as desired. Imparting a spinning motion (i.e., a vortex) to the air propelled by the fan 104 or 204 using vanes (such as the vanes 240 and/or other vanes) or other devices upstream of where the droplets are introduced into the air flow may be effective to entrain the droplets in the spinning air flow and obtain even more improved control over emission directionality and distance. Optionally, the fan speed and operation may be adjusted and controlled in such a manner that the propelled distance and the spray pattern of the fine particles are varied as desired. This adjustment may be in response to depression of the trigger 116 or 216 of the actuator 112 or 212 with the amount of depression of the trigger controlling the magnitude of adjustment. Alternatively, such adjustment may occur in response to setting of a member to one of several discrete positions, or any other control methodology and/or device could be employed. Hence, there can be a more controlled application of the fluid to desired surface(s). This is particularly important when a pesticide or other chemical formulation is to be applied only to particular surface(s) depending on the type of formulation and the intended use of the fluid dispensing device 100 or 200. As described below, the operation of the fan may be changed and controlled as desired by a circuit board as changes in each application (i.e., the type of fluid emitted) warrant. The fan and, perhaps, other components can be configured to deposit fluid between about 3 or fewer feet away and about 20 or greater feet away from the housing.

Container

In the disclosed embodiments of FIGS. 1-7, the desired fluid is provided in a container that is preferably pressurized and is introduced to the inside of the housing for propulsion and emission toward a remote surface disposed a distance away. A variety of containers may be used wherein each operate in a different manner. For example, the container may be either a bag-on-valve (BoV) container or a non-BoV container. A BoV valve can spray in any orientation. Non-BoV valves fall into two types: vertical and tilt actuated valves. A vertical valve has a dip tube and is actuated by applying a downward force to the valve when the container is oriented in an upward direction (i.e., when the container is disposed vertically and the valve up disposed upwardly). The tilt valve is actuated by a sideways force to the valve. Yet another valve is a "spray any way" valve employing a flow valve that permits spraying at any position of the container, except when the container is oriented horizontally. The BoV system includes an aerosol valve attached to a bag. The formulation or product is placed inside the bag and a propellant fills the space between bag and can, and hence, a BoV container may be used for an environmentally-friendly purpose. When a button on the valve is pressed, the formulation inside the bag is dispensed with the aid of the pressurized/compressed propellant, which squeezes the bag. The propellant in the case of a BoV may be compressed air/nitrogen, thereby avoiding the use of hydrocarbons. As should be evident from the foregoing, in BoV systems, the propellant is separated from the formulation and does not affect the chemical characteristics of the formulation. Another feature of the BoV system is that the fluid dispensing device can be disposed and actuated at any angle, thus rendering the container particularly suited for use in the device 200 (although the container could be used in the device 100). A still further feature of the BoV system is that the container may be a single predetermined size regardless of the fluid to be dispensed and instead the quantity of the formulation can be adjusted by choosing different size bags to be inserted into the can depending on the required usage or the application of the formulation.

Other types of non-BoV aerosol containers may alternatively be used that are different from the BoV system in the sense that the propellant and the formulation are disposed together within the container. In such non-BoV systems, the propellant is usually a hydrocarbon substance. If desired, a different volatile substance could be used as a propellant, including an alcohol, such as isopropyl alcohol, ethanol, methanol, butyl alcohol, polyhydric alcohols, unsaturated aliphatic alcohols, acyclic alcohols, etc. and combinations thereof.

Such non-BoV pressurized containers have the advantage that very small droplet sizes can be formed and emitted. Further, such containers do not exhibit a substantial decrease in pressure as the fluid is dispensed, as is experienced by BoV systems. It may be noted that some non-BoV systems that use an elongate dip tube inside the container must be maintained in substantially a vertical orientation as the contents are emitted so as to maintain the end of the dip tube in contact with the container contents. Otherwise, improper dispensing can result. This results in such a container not being ideally suited for use in the device 200. However, other non-BoV systems do not use an internal elongate dip tube, and such containers incorporating such systems may be suitable for use in the device 200.

In any of the embodiments of FIGS. 1-7, an adjustable container holder may be attached to or incorporated within the housing to accommodate different-sized containers. Also, the container can be replaced by any other vessel that uses a pump to accomplish fluid flow.

Still further, a vessel containing an unpressurized or pressurized first fluid may be provided that is fluidically coupled to a first inlet of an air assist nozzle. A second inlet of the air assist nozzle receives pressured air or another pressurized second fluid, for example, as developed by a pump. The first fluid is provided to a chamber of the air assist nozzle and the pressurized air or pressurized second fluid is introduced into the chamber to shear the first fluid into small droplets (perhaps as small as 5 microns or smaller), which are emitted and entrained into the air flow induced by the fan.

A spray-through overcap may be used in the device on the container. Such an overcap includes an overcap body and an orifice for directing the emitted droplets. One could readily produce such an overcap by adding material to an existing mold for such an overcap to form a recess or void in the produced overcap. A tab or other projection in the housing may mate with the recess in the cap to properly orient the orifice of the overcap.

As a still further alternative, a container may include a fitting or other member disposed on a valve stem of the container. The fitting or other member may direct the emitted droplets in a particular direction. The fitting or other member may be received within and be retained by a fitting receiver disposed in the housing that receives and retains the fitting or other member in the proper orientation. The fitting receiver may be of single-piece construction, or may have a clamshell configuration, or may be of any other construction.

Actuator

Dispensation of the formulation content of the container is facilitated via the delivery mechanism such as an actuator. As the actuator is operated, the formulation is delivered from the container through the housing of the fluid dispensing device 100 or 200. The actuator may include a button or a trigger or both. The actuator may have a proprietary structure such as a keyed arrangement requiring the container and the actuator to be keyed together for proper operation and ensuring that the droplets are emitted from the container in the proper direction. The keyed arrangement may enhance child safety and may further prevent accidental discharge of formulation/aerosol content from the container when the container is disengaged from the actuator.

If desired, a user may be required to follow a specific installation sequence or protocol in order to assemble and use the container with the housing. Such a requirement can be implemented to ensure that only containers intended for use with the housing can, in fact, be used. This feature can improve safety. Still further, the actuator and/or housing may be designed with an interlocking feature. For example, a user may be required to depress a button 320 (FIG. 3) before a trigger 322 can be depressed to dispense a fluid. In this example, the user may be able to depress the button 320 with one hand while depressing the trigger 322 with another hand, or both the button 320 and the trigger 322 may be depressed by a user using the same hand. In any event, the use of an interlocking feature can improve safety by reducing accidental discharges of fluid.

Various control techniques may be implemented by mechanically, electromechanically, and/or electrically linking the actuator with one or more other features. For example, one may interlock the actuator mechanism with the fan to provide, among other things, safer operation, a one-handed operation, a variable overall emission rate (implemented by a variable fluid dispensing rate from the container or a variable fan speed, or both), and/or an intermittent or continuous operation of the fluid dispensing device 100 or 200. For example, an interlocking feature may permit a user to depress the button 320, which in turn enables the user to depress the trigger 322 to cause fluid emission. Once the trigger 322 is depressed, the user can release the button 320, whereupon the button 320 remains in the depressed condition, thereby allowing the user to squeeze the trigger 322 to continuously dispense fluid. The button 320 remains in the depressed state until the trigger 322 is released, at which point the button 320 returns to the non-depressed state. Thereafter, the user is required to depress the button 320 again to depress the trigger 322 and resume dispensing of fluid. In another embodiment, it may be desired to provide for a continuous delivery of fluid without pulling the trigger 322 continuously. For example, the user may push the button 320 one or more predetermined number of times to cause the trigger 322 to stay in a locked continuous delivery position without having the user's finger on the trigger 322, thereby resulting in less hand fatigue for the user/user. Alternatively, it may be desired to limit the amount of time that the trigger 322 remains in a locked continuous delivery position by utilizing a timing mechanism interconnected with the actuator such that the actuator is deactivated after a predetermined time period. The foregoing control techniques or any other desired fluid dispensing device operational controls may be effected by the combination of the trigger, the button, or any other activation mechanism as may be known in the art.

In another embodiment of the fluid dispensing device 100 or 200, the fan 104 or 204 may be interlocked with the actuator such that the fan begins to run when the actuator is actuated and stops running when the actuator is deactivated, or begins and/or stops running a predetermined time or times before or after the actuator is activated or deactivated, respectively. Specifically, as seen in FIG. 3, a circuit board 350 may be incorporated (described below) in or with the fluid dispensing device 100 or 200 to sequence the operation of the actuator and the fan based on a desired application. For instance, a programmable device 352, such as an application specific integrated circuit (ASIC), a microcontroller, or another device may be mounted on the circuit board 350 together with other components and programmed such that when the trigger 322 or other operable element on the actuator is depressed or otherwise operated, the fan is energized for a predetermined period of time before the actuator is actuated to allow the formulation to be introduced into the housing. Moreover, when the trigger 322 or other operable element is released, the programming may allow the fan to continue running after the actuator is deactivated so that any remaining formulation is flushed out from the fluid dispensing device 100 or 200. This provides for self-cleaning of the fluid dispensing device 100 or 200.

Nozzle

Referring to FIG. 5, a nozzle 400 may be provided at the emission end of the fluid dispensing device 100 or 200 to direct and control the dispensation of the formulation. The nozzle 400 may have a fixed or controllably adjustable orifice 402 to control the pattern and the distance of the projection of the dispensed formulation. A detachable extension tube 404 may be fitted onto an end of the nozzle 400 by, for example, a press fit, to extend the reach of the nozzle 400 outwardly and away from the user to minimize blowback and/or allow better reach in less accessible places. The nozzle 400 and/or tube 404 may pivot in an up-down or side-to-side fashion to make it more convenient to apply the formulation to the ground or under foliage while minimizing bending and stretching by the user. The nozzle 400 and/or tube 404 may have one or more telescoping sections, for example sections 400a, 400b, for longer reach, and easier storage. Moreover, the nozzle 400 and/or tube 404 may have a larger diameter proximal to the housing 102, 202 that tapers to a smaller diameter distal from the housing resulting in a narrow tip opening (such tapering is illustrated in connection with the extension tube 404 and narrow tip opening 406). The narrow tip provides a more precise control for better aim of the projecting formulation. The nozzle 400 and/or tube 404 may be detachable from the housing 102, 202 to allow the user to switch the nozzle 400 and/or tube 404 for different applications, easier cleaning, and achieving a variable spray pattern.

Droplet Size

Fine droplet sizes may be needed to achieve an efficacious result in certain applications, such as when spraying mosquitos. The combination of the actuator, the formulation (including the propellant in non-BoV systems), the type of container, the forced-air fan, and the shape of the nozzle contributes to the production and emission of fine droplet sizes of the formulation in a range of about 5 microns or smaller to about 400 microns or larger. The desired or efficacious size of the droplets is dependent upon the desired result of the dispensing operation of the fluid dispensing device 100 or 200. For example, it has been demonstrated that small droplet sizes to be most efficacious for mosquito knockdown formulations. In an embodiment in which the device 100 or 200 is to be used to repel and kill mosquitos, the droplet sizes are advantageously in a range between about 5 microns or smaller and about 60 microns or larger. The device 100 or 200 can alternatively be used to spray a different insecticide, an animal, insect, or other pest deterrent or killer (e.g., slug control), a herbicide, a fungicide, a mildewcide, an antibacterial formulation, a liquid for mitigating another organism, a fertilizer, a liquid plant food, a coating to protect evergreen foliage or other plants against winter wind burn, or any other liquid at a desired droplet size within the range noted above.

Smaller droplet sizes may be more readily dispersed by the fan than larger droplet sizes from the fluid dispensing device 100 or 200. Understanding that most formulations include an active, a volatile solvent, and a carrier such as oil or water, it may be desirable to promote droplet size decay as the droplet is traveling through the device 100 or 200. This reduction in droplet size may be effected by causing the solvent and/or the carrier to evaporate during such time. To that end, another component such as a heating element 410 may be provided in the fluid dispensing device 100 or 200 as seen in FIG. 3. The heating element helps to accelerate an evaporation rate of a solvent in the formulation droplets. Another approach to reducing the size of the droplets is to provide alcohol and/or one or more other evaporative or volatile solvents as the solvent element in the formulation.

As alcohol has a low boiling point, it evaporates more readily and rapidly as it encounters air flow from the fan and consequently the droplet size is reduced during projection and over a distance from the fluid dispensing device 100 or 200, even without the use of a heating device. A further feature of the disclosed embodiments is that by projecting the droplets farther, they experience a longer hang time in the air before they descend onto a target area. This longer hang time provides more time for evaporation of non-active ingredients such as the solvent and/or carrier in the droplets and further reduces the droplet size as the remaining portion of the droplets is essentially discrete portions of the active ingredient of the formulation.

Fluid Formulation

As part of the formulation, ingredients such as colorants, fluorescent materials, or other similar substances may be provided to increase visibility of the fog or mist. Added colorant(s) in the formulation further aid in aiming the projecting formulation, for example, in low light conditions, and achieving proper coverage of a target area. Still further, a scent or a deodorant may be added.

Rechargeable Battery

In a cordless embodiment of the fluid dispensing device 100 or 200, one or more rechargeable batteries 412 (FIG. 3) may be used to provide power to the fan, the actuator, and power/control circuits or electronics associated with the fluid dispensing device 100 or 200. This eliminates the need for disposable batteries as well as providing a more environmentally friendly fluid dispensing device 100 or 200. Also, the device and operator are untethered by wires, and other energy sources, such as gasoline, kerosene, and the like, are not involved. The rechargeable batteries 412 may be lithium ion, nickel cadmium, or other suitable rechargeable batteries. A charging device with an AC/DC adapter for the rechargeable batteries may be provided with the housing of the fluid dispensing device 100 or 200. In an alternative embodiment, one or more non-rechargeable batteries may be used to power the fluid dispensing device 100 or 200. In a further alternative embodiment, the fluid dispensing device 100 or 200 has a cord for plug-in use in the event that the batteries are run down and fully discharged. In some of the embodiments of the fluid dispensing device 100 or 200, a battery power indicator is included with the batteries to monitor a charge of the batteries in real time. The indicator may be a visual or an auditory indicator that provides the relative or absolute amount of power remaining in the battery (or batteries) at a given time. In some other embodiments, the charging device may be integrated into a storage base for more convenient storage of the entire device 100 or 200 as well as better accessibility, and allow charging of the battery.

Light Source

In another embodiment, a light source 500 (FIG. 3) is provided in or on the fluid dispensing device 100 or 200 to, for example, shine light on the fog or mist that is being emitted. The light source may be a light emitting diode (LED) or other light emitting elements as may be known in the art. The light makes the fog more visible, especially in low light conditions, to assist in aim and proper coverage. The light source 500 may alternatively include a colored light bulb/LED or a colored lens so that the light emitted is colored as it shines on the fog to increase visibility further.

Combinational Use of a Circuit Board and Other Components

In a further embodiment, the programmable device 352 and other components mounted on the circuit board 350 of FIG. 3 may be interconnected with some associated components of the fluid dispensing device 100 or 200 to add more functionality to the operation, reliability, safety and durability of the fluid dispensing device 100 or 200. Referring to FIG. 3, the programmable element 352 together with one or more suitable sensors 510 may be programmed and operable to sense and recognize an engagement of a specialized/customized type of container with the actuator and accordingly control the speed of the fan and/or adjust the orifice of the nozzle and, as a result, control the projected distance and emission of the formulation from the fluid dispensing device 100 or 200. Specifically, each different formulation may be associated with and identified with its own specific container overcap, or a conventional bar code or QR code or other indicia printed on the container, by detecting a color and/or shape of an overcap or other portion of the container, or any other identifying apparatus or technique that may be carried by or associated with the container. The programmable element 352 either separately or in combination with sensors 510 such as a bar code reader, a QR reader, an electromechanical sensor, or one or more other suitable sensors can identify the type of container and thereby the associated formulation therein. Once the type of formulation is identified, then the programmable element 352 may permit or deny the engagement or operation of the container with the actuator. The programmable element 352 may also set the fan speed and control other functions of the fluid dispensing device 100 or 200 based on the type of formulation being used.

The circuit board 350 may pulse the fan and/or the introduction of the formulation fluid into the housing. The pulsing feature optimizes battery life because the fan is not running continuously. Also, as the formulation fluid is pulsed via the actuator in optimized amounts into the housing instead of being continuously fed in the housing, the run time (usage) of the formulation fluid is extended. Pulsing of the formulation allows for a controlled quantity and targeted application of the formulation onto a subject.

Another application of the circuit board 350 and programmable element 352 may be in conjunction with a safety sensor. As seen in FIG. 3, a safety sensor 600 such as an ultrasonic sensor, an optical sensor, or one or more other similar sensors known in the art is provided in or on the fluid dispensing device 100 or 200. When the safety sensor 600 senses the presence of an object too close to the output end of the fluid dispensing device 100 or 200, the sensor 600 provides a signal to the circuit board 350 which either turns off the device 100 or 200 or prevents the fluid dispensing device 100 or 200 from turning on. This minimizes the probability of accidental spraying of people or animals.

Yet another application of the circuit board may be in connection with a movement/position detector 602 (FIG. 3) such as a gyroscope, an accelerometer, a GPS unit, and/or one or more other components known in the art that detect orientation or position. With this combination, the circuit board 350 and/or programmable element 352 receive signals from the detector 602 and can change the fan speed and/or control the operation of other components of the fluid dispensing device 100 or 200 depending on whether the fluid dispensing device 100 or 200 is pointing up, down, or horizontally and/or based on the position of the device 100 or 200. In such situations the rate at which fluid is dispensed may be made dependent upon orientation and/or position of the device 100 or 200. Thus, at appropriate orientations and/or locations, the fan speed and/or the actuator setting may be reduced, thereby reducing the amount of formulation product being dispensed. As a consequence, conservation and optimization of use of the formulation product are realized. Another feature could be implemented wherein the device is automatically shut off if the device is dropped or placed on the ground. If desired, the circuit board 350 may communicate via any known technology (e.g., Bluetooth or Wi-Fi) with a smartphone, a tablet, a computer, or the like to communicate data, such as device attitude and/or position, time and date of application, application rate, or any other data that might be used by a user or another to diagnose, treat, track, and/or fulfill application requirements.

Figure 8:
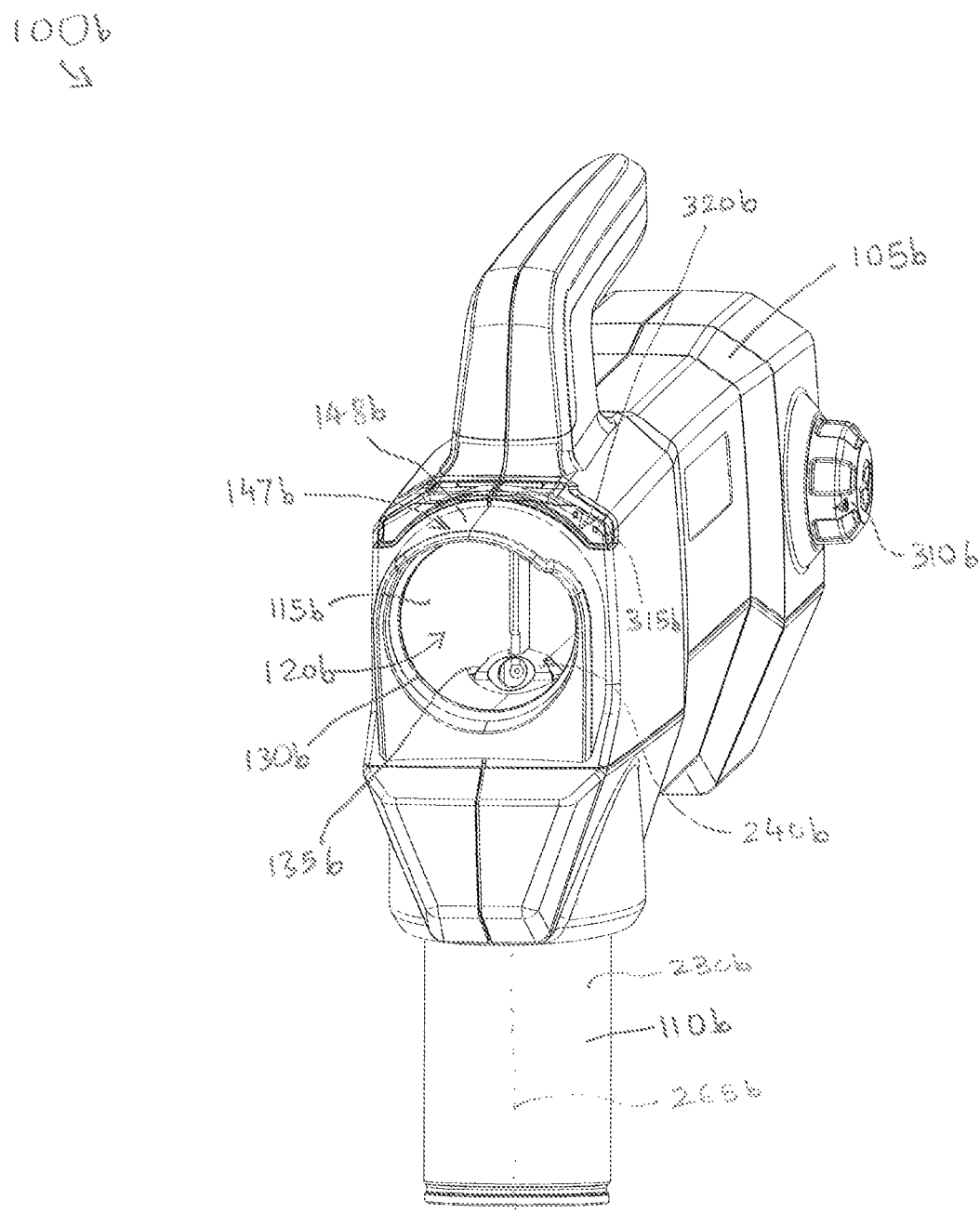
FIG. 8 is a front isometric view of yet another embodiment of a fluid dispensing device.
Figure 14:
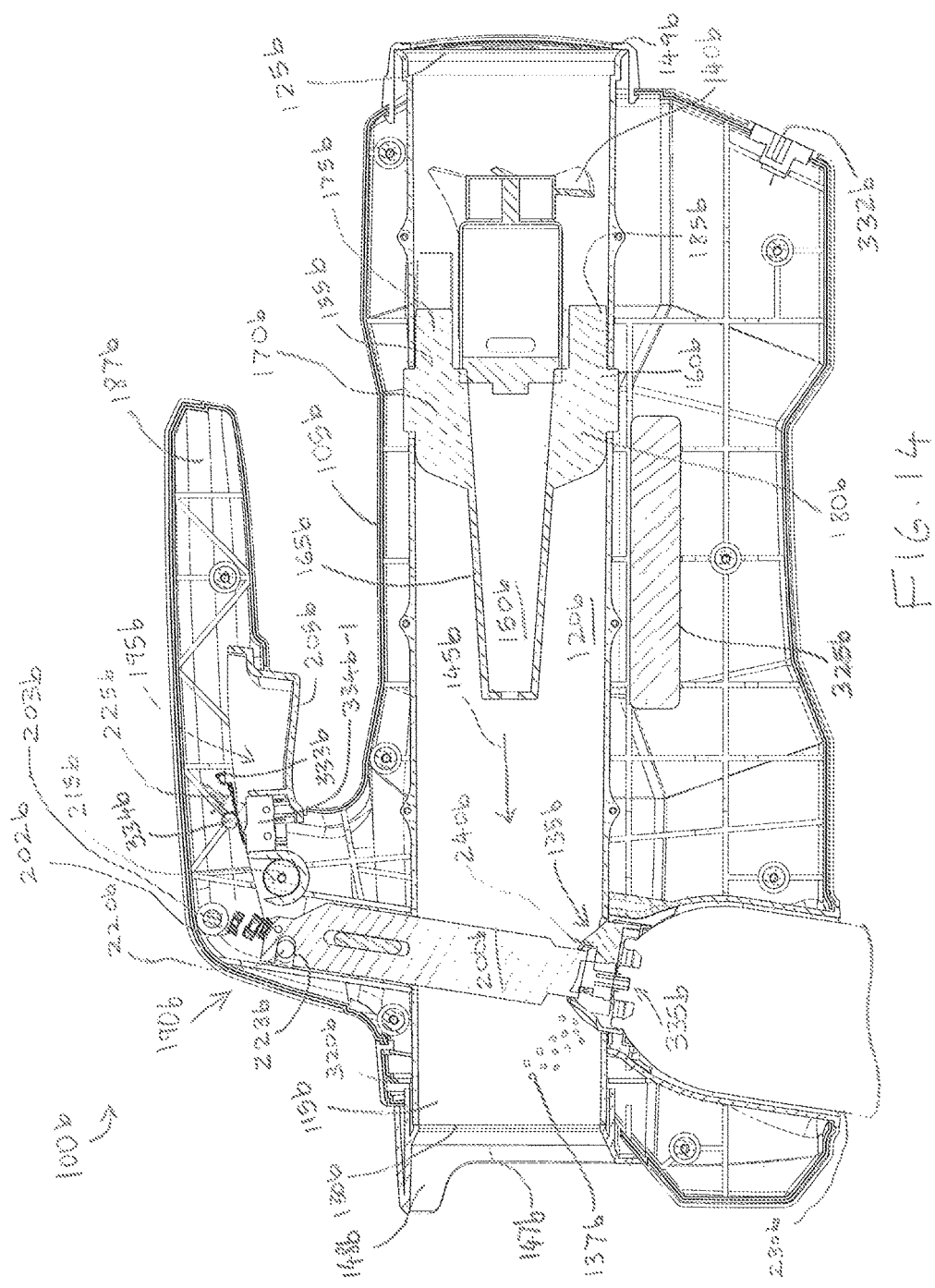
FIG. 14 is a cross sectional view taken generally along lines 14-14 of FIG. 12.

FIG. 8 shows a fluid dispensing device 100b that includes a device housing 105b and a container 110b. As shown in FIG. 14, the device housing 105b includes a substantially cylindrical interior surface 115b having a central longitudinal axis 118b. As further shown in FIG. 14, the interior surface 115b defines a passage 120b that extends between a first end 125b and an emission end 130b. The first end 125b and the emission end 130b are in fluid communication with ambient air. Referring again to FIG. 8, the container 110b is coupled to the device housing 105b such that a portion of the container 110b extends through an aperture 135b of the interior surface 115b, thereby facilitating entry of a fluid 137b from the container 110b into the passage 120b. The aperture 135b is disposed at a bottom portion of the interior surface 115b. Referring again to FIG. 14, the interior surface 115b encloses a fluid moving device such as a fan 140b disposed proximal the first end 125b and operable to develop air flow in the passage 120b in a direction 145b toward the emission end 130b. The aperture 135b is disposed downstream of the fan 140b and upstream of the emission end 130b. The central longitudinal axis 118b of the interior surface 115b is preferably (but not necessarily) coincident with the rotational axis of the fan 140b. The air flow generated by the fan 140b may propel droplets of the fluid 137b released from the container 110b toward the emission end 130b such that the droplets of the fluid 137b are dispensed from the fluid dispensing device 100b in a highly controlled manner. A shield section 147b of the device housing 105b is disposed adjacent the emission end 130b. A top portion of the shield section 148b comprises a protruding member 148b that at least partially surrounds the emission end 130b and shields the user of the device 100 from the fluid 137b being emitted from the emission end 130b. A baffle 149b is disposed over the first end 125b and allows air to flow into the passage 120b and prevents access by, for example, fingers of a user or child from entering the passage 120b.

Figure 15:
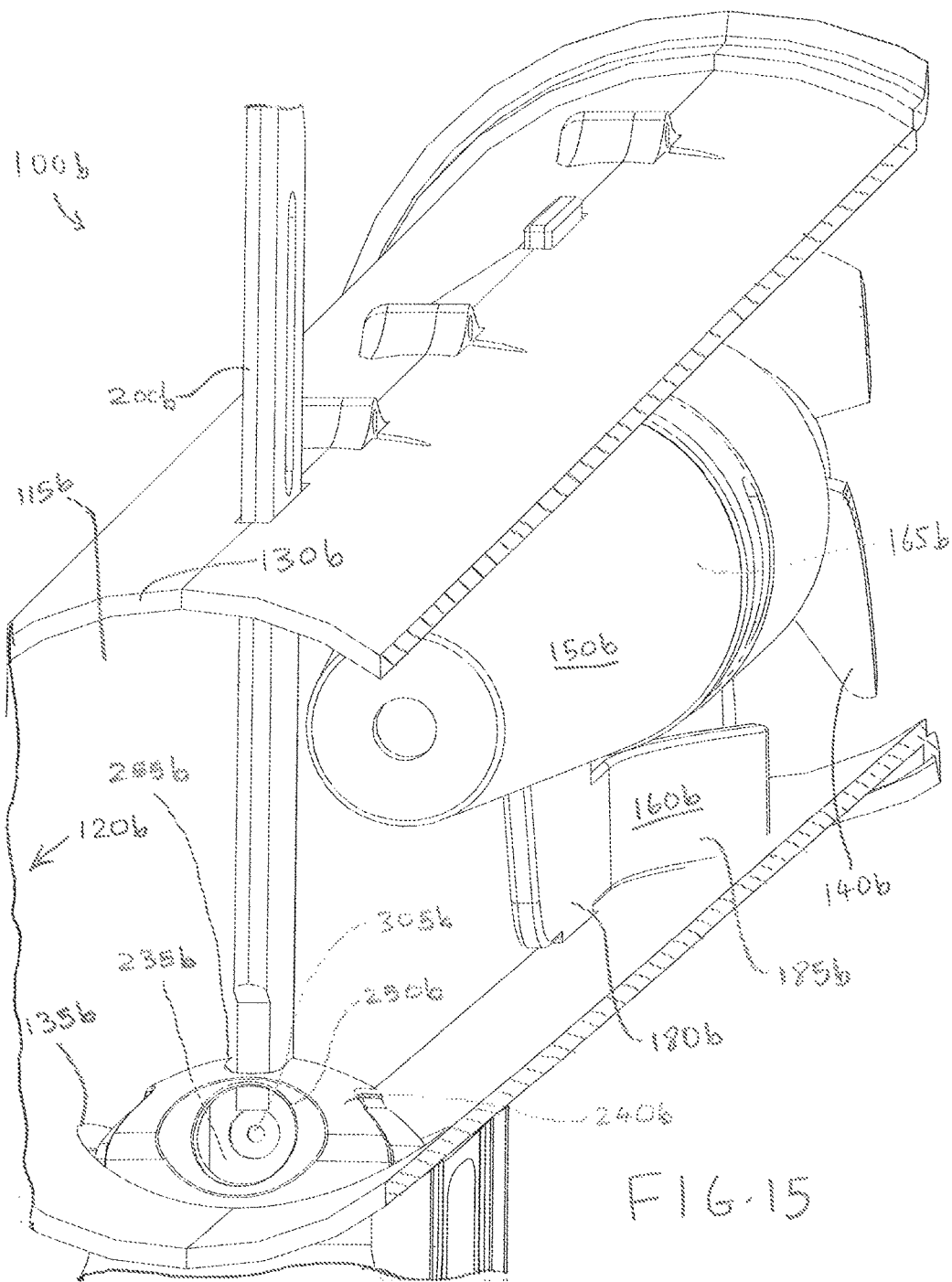
FIG. 15 is a fragmentary, enlarged, isometric cross sectional view taken generally along lines 15-15 of FIG. 12, illustrating the fluid dispensing device without a device housing thereof.

As further shown in FIGS. 14 and 15, the interior surface 115b encloses a guiding member 150b and first and second vanes 155b and 160b attached to or integral with the guiding member 150b. The guiding member 150b and the first and second vanes 155b, 160b are disposed downstream of the fan 140b and upstream of the aperture 135b. The guiding member 150b includes an outer surface 165b having a substantially frustoconical shape, comprising a diameter that decreases toward the emission end 130b. As shown in FIG. 14, the first vane 155b is attached atop the guiding member 150b and the second vane 160b is attached below the guiding member 150b. The guiding member 150b reduces turbulence in the air flow generated by the fan 140b, thereby improving air flow efficiency.

Figure 16:
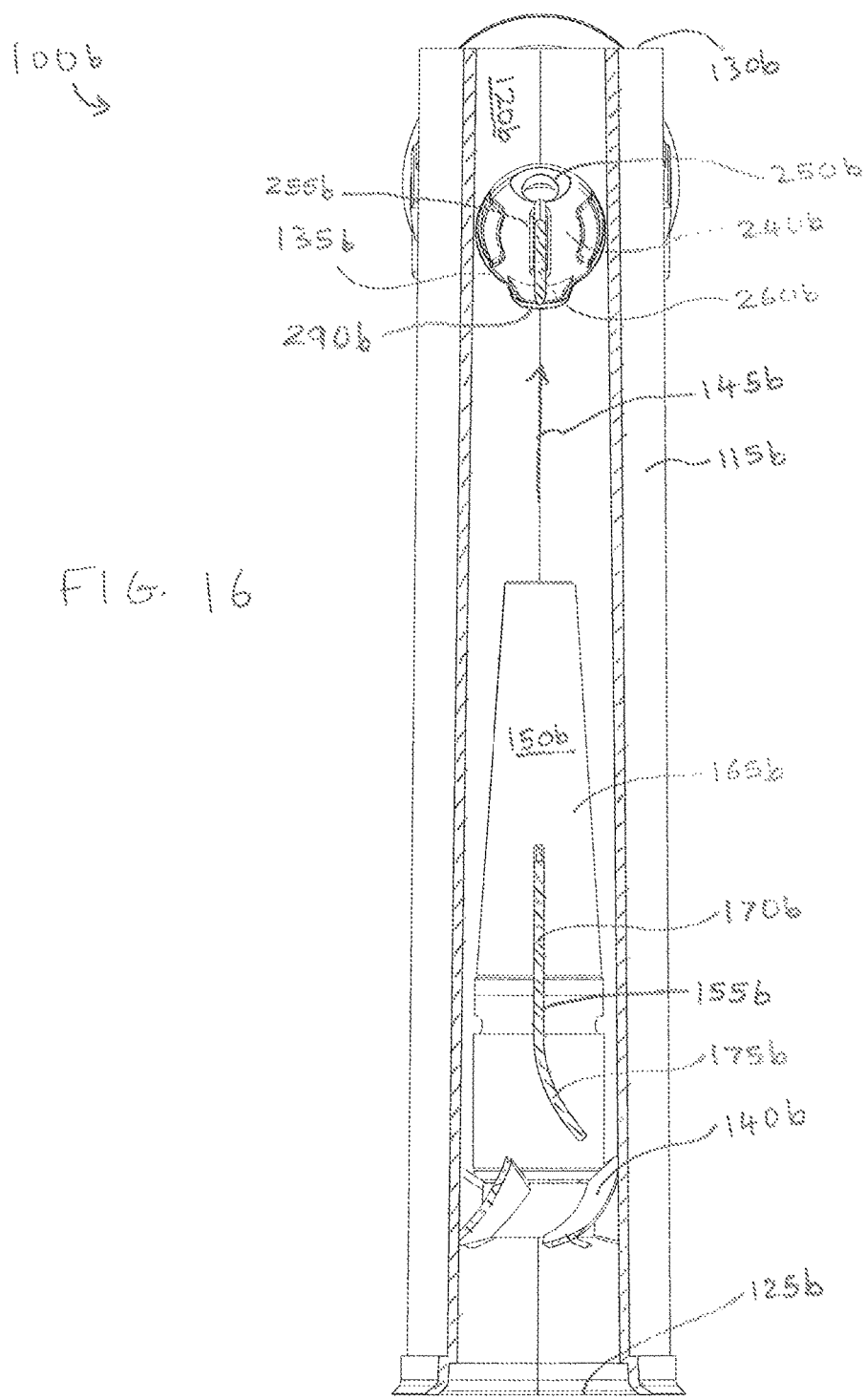
FIG. 16 is a fragmentary cross sectional view taken generally along lines 16-16 of FIG. 12, illustrating the fluid dispensing device without the device housing thereof.

Referring now to FIG. 16, the first vane 155b includes a first portion 170b substantially parallel with the axis 118b and a second portion 175b that is curved with respect to the axis 118b. Additionally, or alternatively, the second portion 175b may be linear and disposed at a non-zero angle relative to the axis 118b. As shown in FIG. 15, the second vane 160b includes a first portion 180b substantially parallel with the axis 118b and a second portion 185b that is curved in a direction opposite the direction of curvature of the second portion 175b. Additionally, or alternatively, the second portion 185b may be linear and disposed at a non-zero angle relative to the axis 118b, with the angle being in a direction opposite the direction of the angle of the second portion 175b. As shown in FIG. 16, the first vane 155b curves away from the axis 118b toward the right side of the device 100b. By contrast, the second vane 160b curves away from the axis 118b toward an opposite side of the device 100b, as shown in FIG. 15. Such an orientation of the guiding member 150b and the first and second vanes 155b, 160b causes droplets of fluid 137b to be emitted out the emission end 130b in a highly controlled manner. For example, the guiding member 150b and the first and second vanes 155b, 160b may optimize the air flow by whirling air into a vortex-like shape. Guiding members and vanes having different shapes than described above may be used to whirl the air into a vortex-like shape or another optimal air flow shape for directing the droplets of the fluid 137b. Additionally, or alternatively, the interior surface 115b may include undulations and/or projections and/or elements of other shapes adapted to optimize the air flow.

Referring now to FIG. 14, a handle 187b of the device housing 105b is disposed above the interior surface 115b. As shown in FIG. 22, the handle 187b is configured to fit comfortably in a hand of a user of the device 100 such that the knuckles of the hand roughly form a line that is either parallel to the axis 118b or disposed at a non-zero angle with respect to the axis 118b. To facilitate such use, the handle 187b is preferably disposed at a shallow angle, such as about between zero and thirty degrees with respect to the axis 118b. As shown in FIG. 22, the handle 187b extends from a front of the device 100b toward a rear of the device 100b. As further shown in FIG. 14, the handle 187b encloses at least a portion of an actuator 190b for actuating/deactuating the release of the fluid 137b from the container 110b and for actuating/deactuating the fan 140b.

Figure 27:
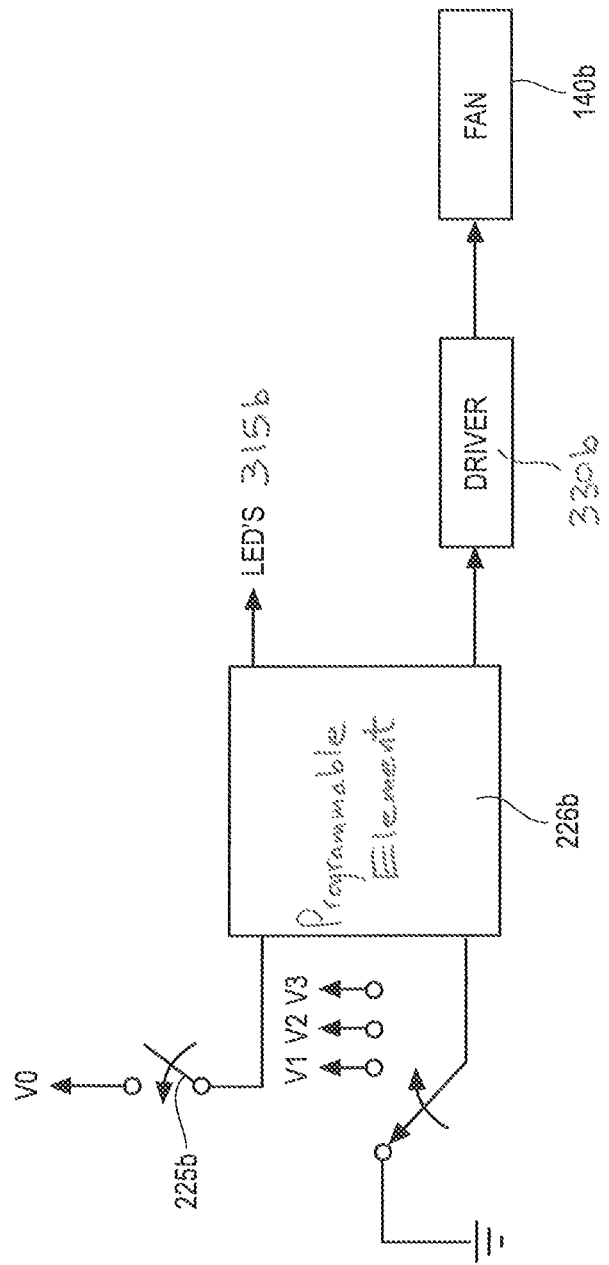
FIG. 27 is a schematic diagram of a circuit that includes a programmable element in electrical communication with at least one LED and/or a fan.

Referring next to FIG. 23, the actuator 190b includes a trigger arm 195b, a plunger 200b operably coupled to the trigger arm 195b, and a return spring 202b having a first end secured to the plunger 200b and a second end secured to a component of the device housing 105b, such as a boss or lug 203b. More particularly, the trigger arm 195b includes a trigger 205b disposed on an underside of the handle 187b, a cylindrical aperture 210b shown in FIG. 24 through which a boss 215b of the device housing 105b extends as shown in FIG. 23, an engaging member 220b that engages surfaces defining a U-shaped slot 223b disposed at an upper end of the plunger 200b as shown in FIG. 14, and a switch 225b in direct electrical communication with the fan 140b or indirectly connected to the fan 140b via a controller or programmable element 226b, such as a microprocessor, an application specific integrated circuit (ASIC), or the like. An example of a circuit that incorporates a controller or programmable element 226b is shown in FIG. 27 and is described in greater detail hereinafter. As shown in FIG. 14, the plunger 200b extends at least partially through the interior surface 115b and is disposed above a portion of the container 110b.

Figure 12:
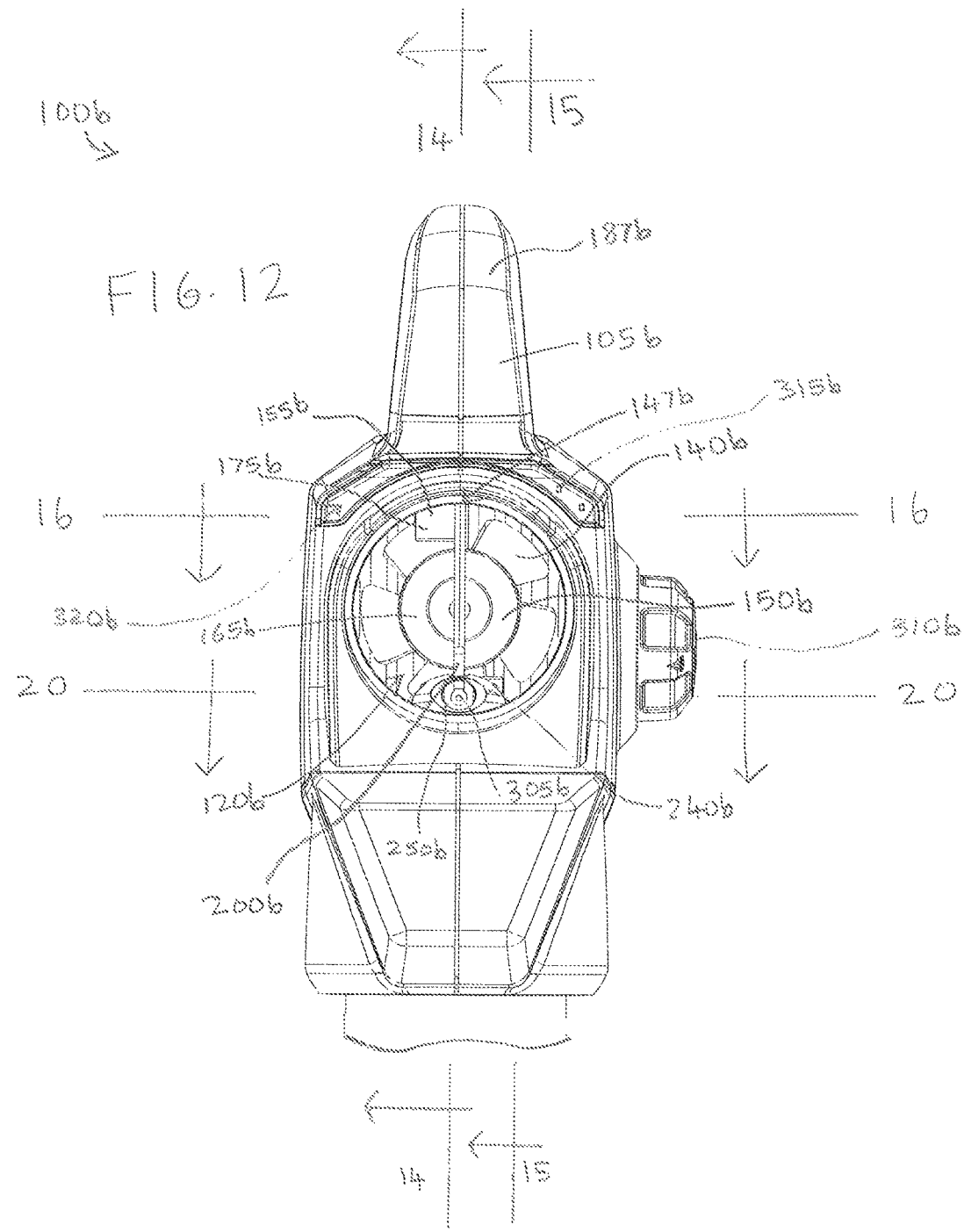
FIG. 12 is a front elevational view of the embodiment of FIG. 8.

The plunger 200b has a plate-like shape and occupies a plane substantially parallel to the central axis 118b, as shown in FIG. 12. As further shown by FIG. 12, the container 110b is disposed in the device housing 105b such that the container 110b is preferably centered on the axis 118b. Moreover, the plunger 200b is preferably centered on the axis 118b such that the plunger 200b is disposed above the container 110b. Such an orientation of the plunger 200b may assist in minimizing possible deleterious effects of the plunger 200b on the air flow generated by the fan 140b. A different plunger orientation may be used as desired, for example, to take into account the vortex induced by the vanes 155b, 160b. It should be noted that the plunger 200b being plate-shaped provides structural strength to the plunger 200b compared to a pin-shaped plunger.

The return spring 202b shown in FIG. 23 is in a relatively relaxed state and the tendency of the spring 202b to remain in the relaxed state maintains the trigger arm 195b in an unactuated state because the spring 202b applies an upward force on the plunger 200b. When the trigger 205b is pulled upward by a user, the trigger arm 195b pivots such that the spring 202b is extended as the plunger 200b moves downward. Conversely, when the user releases the trigger 205b, an upward force is experienced by the plunger 200b because of the tendency of the spring 202b to return to its relatively relaxed state. The upward force experienced by the plunger 200b causes the trigger arm 195b to pivot such that the trigger 205b returns to its unactuated state.

Figure 11:
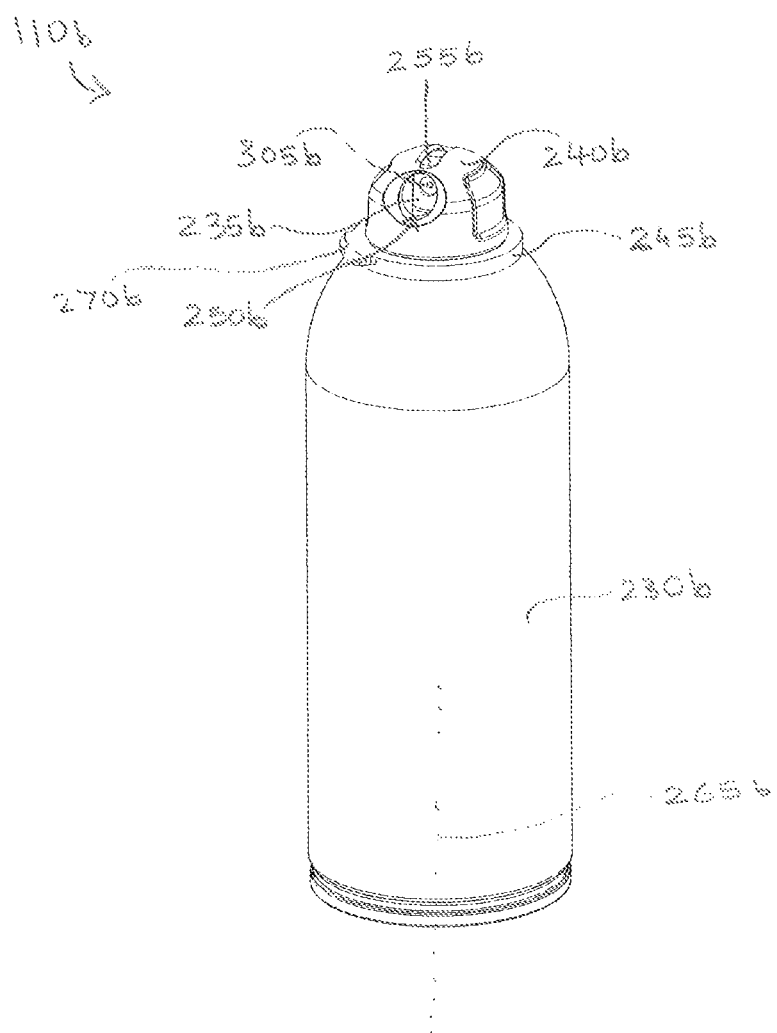
FIG. 11 is an isometric view of the container of the fluid dispensing device of FIG. 8.
Figure 17A:
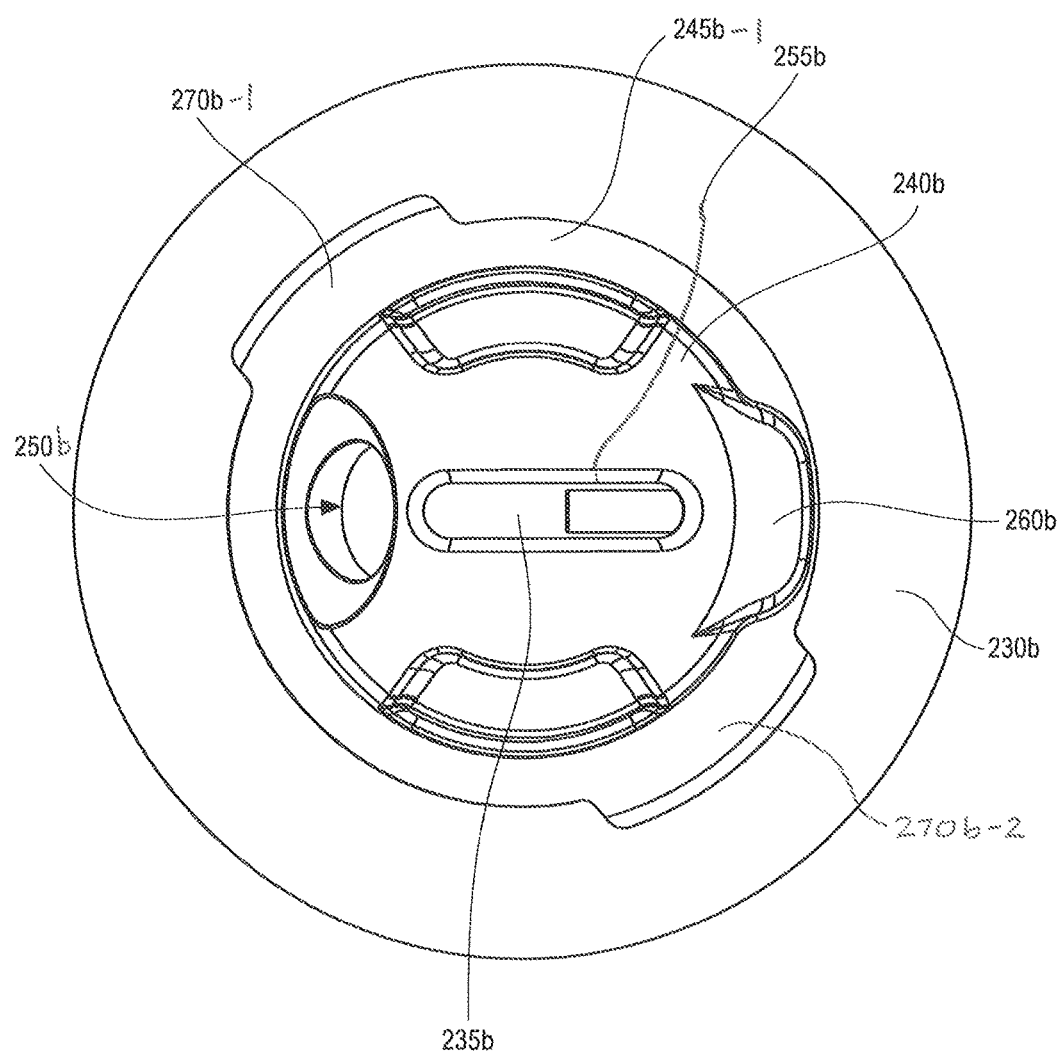
FIG. 17A is a plan view of an alternative embodiment of a container.

Referring now to FIG. 11, the container 110b comprises a container housing 230b, a button 235b atop the container housing 230b, an overcap 240b at least partially enclosing the button 235b, and a fitting member 245b disposed at least partially circumferentially about the container 110b. In the illustrated embodiment, the container 110b comprises pressurized fluid (e.g., the container 110b may be an aerosol spray container as described hereinabove or hereinafter). As shown in FIG. 17, the overcap 240b comprises an orifice 250b to allow flow of the fluid 137b from the container 110b into the passage 120b, an aperture 255b for facilitating actuation of the button 235b by the plunger 200b, and a projecting member 260b for properly aligning the button 235b toward the emission end 130b when the container 110b is mounted to the device housing 105b. The aperture 255b of the overcap 240b is oriented when seen in FIG. 16 such that the aperture 255b extends in a direction parallel to the central axis 118b when the container 110b is mounted to the device housing 105b.

Referring again to FIG. 11, the button 235b and the overcap 240b are rotatable together about the central axis 265b of the container and the overcap 240b is secured to or integral with the button 235b. In the illustrated embodiment, the overcap 240b may have structural members 268b that securely attach the overcap 240b to the button 235b, as shown in FIG. 19. One or more interfitting structures may be carried by the overcap 240b, such as one of structural members 268b, and/or formed in the button 235b, such as a groove 269b receives an end of the one structural member 268b, to fix the overcap 240b to the button 235b and prevent relative rotation of the two. As further shown in FIGS. 17, 18, and 19, one embodiment of the fitting member 245b includes at least one shoulder portion or lug 270b that protrudes outwardly in a direction perpendicular to the central axis 265b. In an alternative embodiment of the container 110b shown in FIG. 17A, a fitting member 245b-1 includes two (or more) shoulder portions or lugs 270*b*-1 and 270*b*-2. Preferably, the shoulder portions or lugs 270*b*-1 and 270*b*-2 are diametrically opposed, although this need not be the case. In both embodiments of FIGS. 17 and 17A, the fitting member 245*b* and 245*b*-1 is secured to or integral with the container housing 230*b* and is not rotatable relative thereto.

The fluid dispensing device 100*b* may be prepared for use as follows. It should be noted that the container 110*b* may be supplied to a user separately from the rest of the fluid dispensing device 100*b*. First, with respect to the embodiment of FIG. 17, the user rotates the overcap 240*b* (and thus, the attached button 235*b*) such that the protruding member 260*b* is disposed opposite the shoulder portion 270*b* of the fitting member 245*b*. Then, the user inserts the container 110*b* into the mounting apparatus 275*b* shown in FIG. 25. As shown in FIG. 21, the mounting apparatus 275*b* comprises a sheath 280*b* and a fitting receiver 285*b* secured to or integral with the sheath 280*b*. As the user inserts the container 110*b* into the device housing 105*b*, the user aligns the protruding member 260*b* such that the protruding member 260*b* is received in a recess 290*b* of the aperture 135*b* (shown in FIG. 20) and the shoulder portion or lug 270*b* is received in a further recess 298*b*, shown in FIG. 21. Once the container 110*b* cannot be pushed upward any farther, the user then rotates the container housing 230*b* (and thus, the fitting member 245*b* attached thereto). As the shoulder portion 270*b* is rotated, the shoulder portion 270*b* moves into an interfering position above a shelf 295*b* of the fitting receiver 285*b* disposed adjacent the recess 298*b*, as shown in FIG. 21. Referring still to FIG. 21, the shoulder portion 270*b* is rotated until the shoulder portion 270*b* contacts a wall 300*b* disposed at an end of the shelf 295*b* of the fitting receiver 285*b*, in turn preventing any further rotation of the container housing 230*b* and maintaining the container 110*b* in a properly mounted state.

Figure 21A:
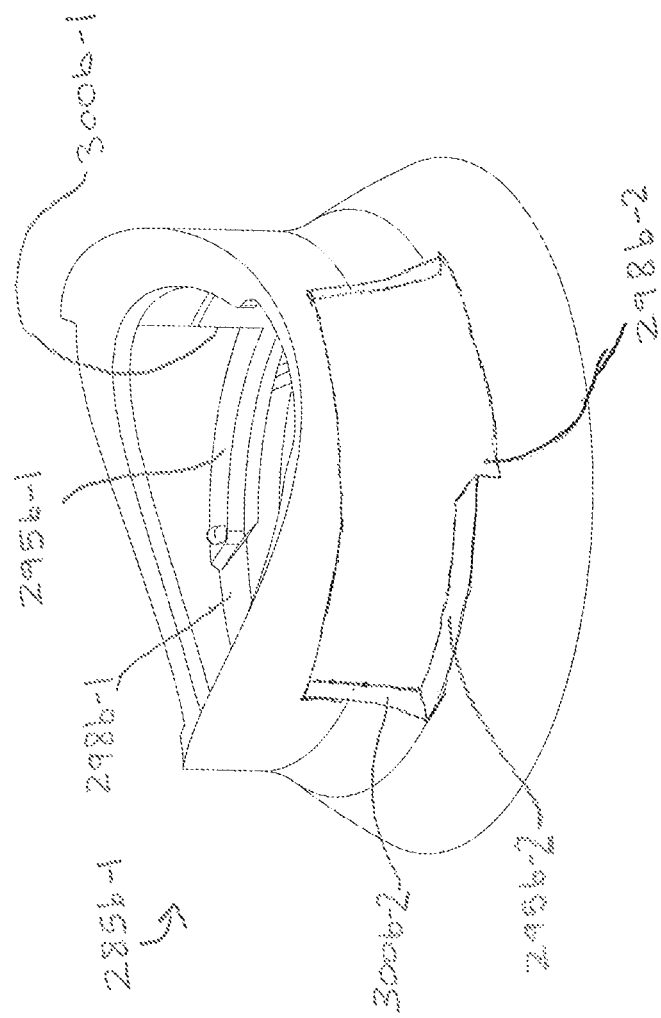
FIG. 21A is an enlarged, exploded, isometric view of an alternative embodiment of a fitting receiver of a mounting apparatus.

FIG. 21A shows an alternative embodiment of a fitting receiver 285*b*-1 comprising a part of a mounting apparatus 275*b*-1 and adapted for use with the fitting member 245*b*-1. The alternative fitting receiver 285*b*-1 comprises two spaced recesses 298*b*-1, 298*b*-2, two spaced shelves 295*b*-1, 295*b*-2 adjacent the recesses 298*b*-1 and 298*b*-2, respectively, and two spaced walls 300*b*-1, 300*b*-2 adjacent ends of the two shelves 295*b*-1 and 295*b*-2. The spacing of corresponding portions of the recesses 298*b*-1 and 298*b*-2, the spacing of corresponding portions of the shelves 295*b*-1 and 295*b*-2, and the spacing of corresponding portions of the walls 300*b*-1 and 300*b*-2 are equal to the spacing of corresponding portions of the two shoulder portions or lugs 270*b*-1 and 270*b*-2. During preparation for use, and with reference to FIG. 17A, the user rotates the overcap 240*b* such that the protruding member 260*b* is disposed opposite the first shoulder portion 270-1*b* and is further disposed above the second shoulder portion 270-2*b*. Then, the user inserts the container 110*b* into the mounting apparatus 275*b*-1 similar to the embodiment shown in FIG. 25. Specifically, as the user inserts the container 110*b* into the device housing 105*b*, the user aligns the protruding member 260*b* such that the protruding member 260*b* is received in a recess 290*b*-1 of the aperture 135*b*, shown in FIG. 20, and the shoulder portions or lugs 270*b*-1 and 270*b*-2 are received in the recesses 298*b*-1 and 298*b*-2. Once the container 110*b* cannot be pushed upward any farther, the user then rotates the container housing 230*b* (and thus, the fitting member 245*b*-1 attached thereto). As the shoulder portions 270*b*-1 and 270*b*-2 are rotated, the shoulder portions or lugs 270*b*-1 and 270*b*-2 move into interfering positions above the shelves 295*b*-1 and 295*b*-2, respectively, of the fitting receiver 285*b*-1, shown in FIG. 21. As further shown in FIG. 21, the shoulder portions or lugs 270*b*-1 and 270*b*-2 are rotated until the shoulder portions or lugs 270*b*-1 and 270*b*-2 contact the walls 300*b*-1 and 300*b*-2, respectively, of the fitting receiver 285*b*-1, in turn preventing any further rotation of the container housing 230*b* and maintaining the container 110*b* in a properly mounted state.

If desired, more than two shoulder portions or lugs 270*b* may be used, in which case a corresponding number and spacings of recesses 298*b*, shelves 295*b* and walls 300*b* would be provided.

Figure 13:
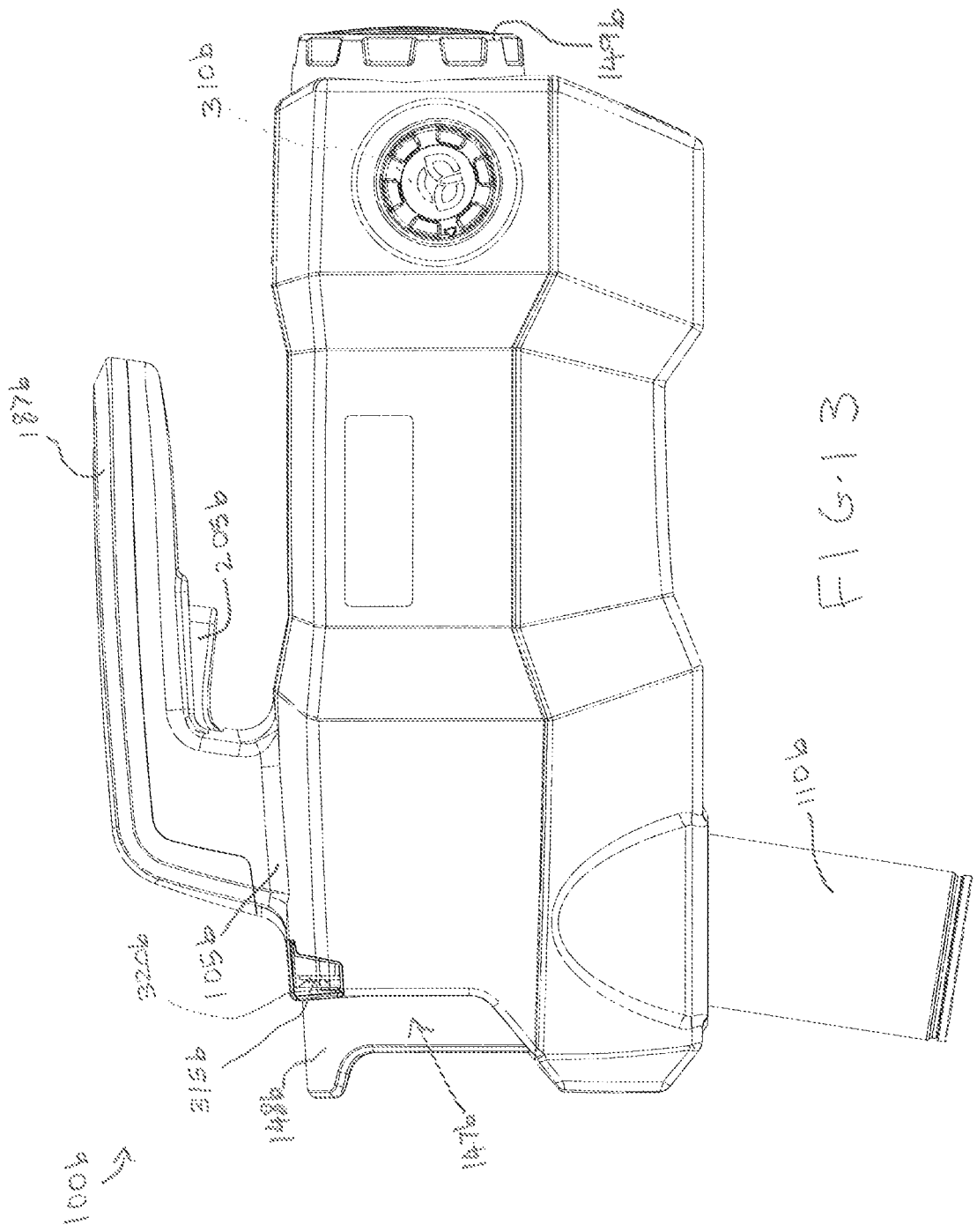
FIG. 13 is a side elevational view of the embodiment of FIG. 8.

The interfering relationship of the shoulder portion(s) 270*b* above the shelf or shelves 295*b* prevents downward movement of the container 110*b* and thus captures the container 110*b* within the sheath 280*b*. Also, when the container 110*b* is in the properly mounted state, the protruding member 260*b* is disposed in the recess 290*b*, thereby properly aligning the orifice 250*b* toward the emission end. Moreover, in the properly mounted state, the aperture 255*b* is disposed below the plunger 200*b*, thereby allowing the plunger 200*b* to extend through the overcap 240*b* to depress the button 235*b* during actuation in turn to release the fluid 137*b* from an opening 305*b* of the button 235*b*, as shown in FIG. 12. Also, as shown in FIG. 13, when the container 110*b* has been mounted to the device housing 105*b*, a central axis 265*b* of the container 110*b* is disposed at an angle other than perpendicular with respect to the central axis 118*b* of the interior surface 115*b*. More preferably, the central axis 265*b* is oriented with respect to the central axis 118*b* such that fluid 137*b* is sprayed through the orifice 250*b* in a slightly upward direction rather than in a direction exactly parallel to the central axis 118*b*. Preferably, an axis of the spray pattern ejected out the orifice 250*b* forms a non-zero angle up to about 30 degrees with respect to the central axis 118*b* of the interior surface 115*b*. This introduction of the fluid 137*b* at a non-zero angle introduces the fluid 137*b* into the air flow developed by the fan 140*b* in a substantially even manner so that the resulting distribution of the fluid 137*b* in the emitted air flow is substantially uniform.

Figure 9:
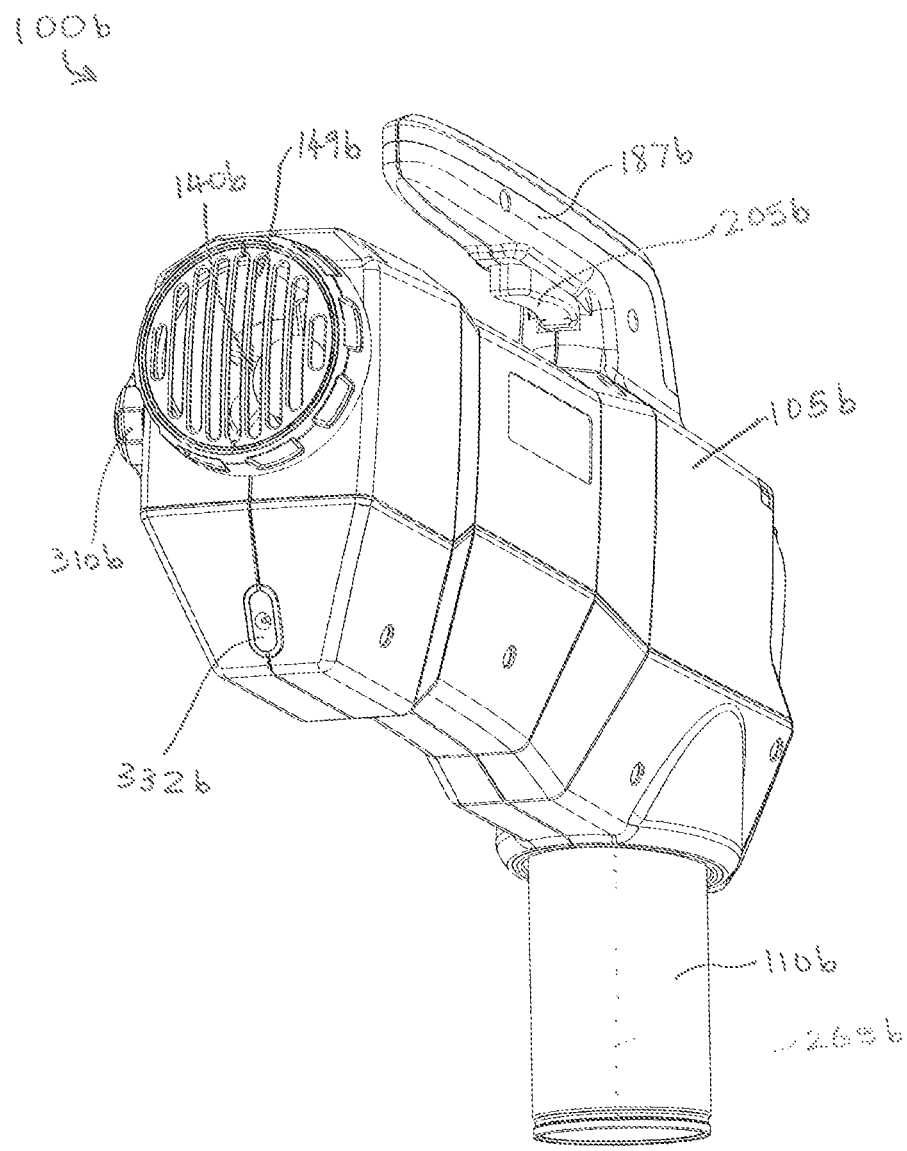
FIG. 9 is a rear isometric view of the embodiment of FIG. 8.

After the container 110*b* has been properly mounted to the device housing 105*b*, the user may rotate a knob 310*b*, shown in FIG. 8. The knob 310*b* may actuate a light source, such as one or more LEDs 315*b* disposed on a circuit board 320*b* disposed substantially vertically adjacent and at least partially surrounding the interior surface 115*b* at the emission end 130*b*, as shown in FIG. 25. As shown in FIG. 26, one or more LEDs 315*b* (and preferably, four LEDs 315*b*-1 through 315*b*-4) may be of the front-firing type to provide light forward of the emission end 130*b* to illuminate a target as well as to illuminate the fog or mist emitted out the emission end 130*b*. In the preferred embodiment some of these LEDs may emit white light and the remaining LEDs emit light of another hue or hues, although these LEDs may emit different hues or the same hue. One or more of the remaining LEDs 315*b* (and preferably, four LEDs 315*b*-5 through 315*b*-8) may be of the side-firing variety and serve as battery charge state indicator lights that provide light in a direction perpendicular to the central axis 118*b*, preferably in the up direction. The battery charge status indicator lights may include red and green LEDs, for example, to indicate fully charged or discharged states and charge states intermediate fully charged and discharged states. Additionally, the turning of the knob 310*b* causes electrical power developed by a rechargeable battery 325*b* to be made available to the switch 225*b* (if no controller or programmable element is used) or to the controller or programmable element 226*b* and electrical components associated therewith as shown in FIG. 27. In the latter case, the fan 140*b* and LEDs 315*b* are preferably operated by the controller or programmable element 226*b*. A power conditioning circuit (not shown) may develop one or more voltages from the power developed by the battery 325*b* to operate the fan 140*b* at one or more selected speeds directly via the switch 225*b* or to instruct the controller or programmable element 226*b* to operate the fan 140*a* at a selected speed, optionally via a driver circuit 330*b* as seen in FIG. 27. In the preferred embodiment, the rechargeable battery 325*b* is at least partially enclosed by the device housing 105*b* and may be charged by a charging circuit while the battery remains in the housing 105*b*, in which case a charging port 332*b* adapted to receive a connector of a charging cable and associated charging circuit may be provided in or on the housing 105*b*, as seen in FIG. 9. Additionally, or alternatively, the device 100*b* may be supplied with a separate AC-powered charging dock into which the device 100*b* may be placed for charging the battery 325*b* via mating contacts on the device 100*b* and the charging dock. Still further, one or more replaceable batteries that are detachable from the device housing 105*b* for charging could be used, similar to the batteries that are used in some portable tools, such as a portable power drill. Still further, non-rechargeable batteries and/or other types of power sources may be used.

After the knob 310*b* has been turned, the user grips the handle 187*b* and aims the emission end 130*b* toward an intended application region while holding the device 100*b* at roughly waist-level. Then, the user pulls the trigger 205*b* upward. As the trigger 205*b* is pulled upward by a user, the trigger arm 195*b* pivots about the boss 215*b*, preferably first raising the switch 225*b*, which has a spring-loaded actuating arm 333*b* in contact with a boss 334*b* of the housing 105*b*. Raising of the switch 225*b* causes the actuating arm 333*b* to move relative to a body 334*b*-1 of the switch 225*b*, in turn eventually closing the switch 225*b* so that the fan 140*b* is initially turned on, either by direct application of electrical power via the switch 225*b* or by signaling the controller or programmable element 226*b* via the switch 225*b* to actuate the fan 140*b*. The air flow developed by the fan 140*a* is whirled into a vortex-like shape because of the presence of the guiding member 150*b* and the vanes 155*b*, 160*b*. Thereafter, further upward pulling of the trigger 205*b* causes the engaging member 220*b* to move downward, in turn moving the plunger 200*b* downward. Downward movement of the plunger 200*b* depresses the button 235*b*, which causes the pressurized fluid 137*b* to be released from the container 110*b* through the orifice 250*b* of the container 110*b* and thereby causes the container 110*b* to release the liquid container contents 137*b* into the passage 120*b* defined by the interior surface 115*b* while the fan 140*b* is developing air flow in the passage 120*b*. The air in the passage 120*b* with the droplets of container contents 137*b* entrained therein are thereby emitted out the emission end 130*b*.

The vortex-like shape of the air flow causes the droplets of the fluid 137*b* to be propelled farther and more precisely than would be otherwise possible. In addition, as the droplets of the fluid 137*b* are entrained in the air flow, the droplets may be sheared into smaller sizes. Moreover, the farther the droplets are propelled, the more opportunity for shearing exists.

When the user wishes to terminate emission of material from the container 110*b*, the user releases the trigger 205*b*, thereby initially retracting the plunger 200*b* and closing the valve 335*b* of the container 110*b* (seen in FIG. 14) and thereafter causing the spring-loaded arm 333*b* of the switch 225*b* to move upwardly relative to the switch body 334*b*-1, thereby returning the switch 225*b* to the open state. Opening of the switch 225*b* causes electrical power to be removed from the fan 140*b*, either immediately upon opening of the switch 225*b* or upon expiration of a delay period following opening of the switch 225*b*. The latter operation is facilitated by using the controller or programmable element 226*b*, which may be programmed to implement such delay.

Turning the fan 140*b* on before actuating the container valve 335*b* as the user is pulling the trigger 205*b* upwardly ensures that the air flow is established in the passage 120*b* before the contents of the container 110*b* are released therein. Conversely, turning the fan off after the container valve 335*b* is closed as the user is releasing the trigger 205*b* ensures that air flow continues after the release of container contents is terminated, so that all of the container contents that have been released into the passage 120*b* are emitted through the emission end 130*b*. If desired, the fan 140*b* may be turned on concurrently with or after actuation of the container 110*b* and/or may be turned off concurrently with or before deactivation of the container 110*b*.

Figure 10:
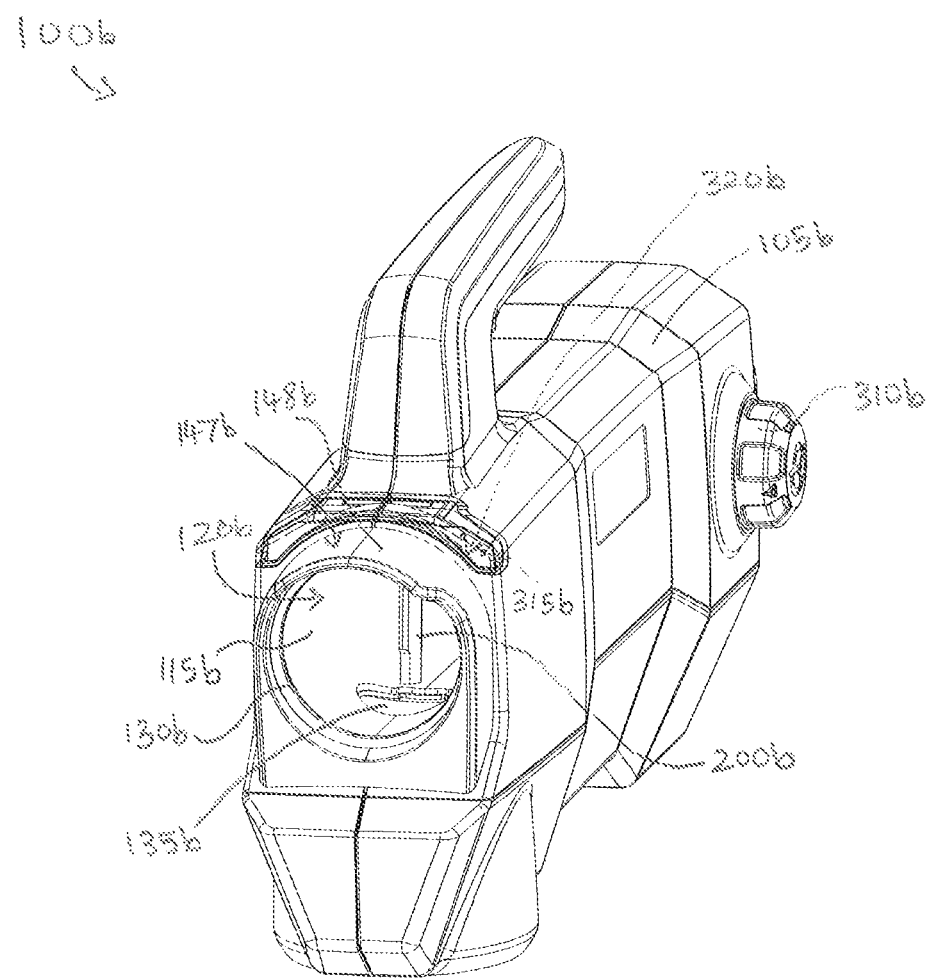
FIG. 10 is an isometric view of the fluid dispensing device of FIG. 8 without a container.

The location of the trigger 205*b* increases the ease-of-use of the fluid dispensing device 100*b*. Because the trigger 205*b* is disposed along a bottom surface of the handle 187*b* and is actuated by applying a force in an upward direction on the trigger 205*b*, a user can hold the device 100*b* with one hand at waist level during use (i.e., during application of the fluid 137*b* to a region some distance forward of the emission end 130*b*). Moreover, the shape of the handle 187*b* and the space between the handle 187*b* and a top surface of the device housing 105*b* is ergonomic. Also, components of the device 100*b* are disposed in the device housing 105*b* strategically such that the device 100*b* is well balanced and is easy to carry for long periods of time. The well-balanced nature of the device 100*b* is such that the device 100*b*, without the container 110*b*, is able to stand upright, without external support, when placed by a user on a substantially flat surface (FIG. 10 shows the device 100*b* without the container 110*b*). This allows the user to conveniently place the device 100*b* in an upright position on, for example, a table, between periods of use. In addition, the device housing 105*b* and/or other components of the device 100*b* preferably, but not necessarily, comprise polyethylene, polypropylene, and/or other olefin(s). The fluid 137*b* may comprise an insect, animal, and/or pest repellant or killer (e.g., slug control), a herbicide, a fungicide, a mildewcide, an antibacterial formulation, a liquid for mitigating another organism, a fertilizer, a liquid plant food, a coating to protect evergreen foliage or other plants against winter wind burn, a barrier, a material that creates a mist or fog for another purpose (such as for theatrical effect), or any other material as described herein. It should be noted that the container 110*b* may comprise a propellant to be used in conjunction with the fluid 137*b*, such as an organic propellant of any known type, preferably one that is free of Volatile Organic Compounds (VOCs), and/or an inorganic propellant of any known type.

When the container 110*b* has been used to such an extent that no more pressurized fluid 137*b* remains in the container 110*b*, or if there is a need or desire to remove the container 110*b* from the device 100*b*, the container 110*b* may be removed from the device housing 105*b* using a process that is the reverse of the process described above for mounting the container 110*b*. The above steps may then be repeated to install a new or different container.

Fan

In the fluid dispensing device 100*b*, the fan 140*b* may be used to propel fine particles of the fluid 137*b* out of the housing 105b. The fan 140b may be positioned within the housing 105b or it may be placed externally at one end of the housing 105b to provide forced air from the first end 125b to the emission end 130b. An external fan may be disposed in a fan housing. The fan 140b may be of any type, for example, including a type with one or more fan blades or an axial or radial impeller, or may comprise an inductor fan. The guiding member 150b and the vanes 155b, 160b may be movable. Forced air helps counteract effects of wind on fluid emission direction and helps the user to direct emission as desired. Optionally, the fan speed and operation may be adjusted and controlled in such a manner that the propelled distance and the spray pattern of the fine particles are varied as desired. This is particularly important when a pesticide or other chemical formulation is to be applied only to particular surface(s) depending on the type of formulation and the intended use of the fluid dispensing device 100b. As described above, the operation of the fan 140b may be changed and controlled as desired by a programmable element 226b as changes in each application (i.e., the type of the fluid 137b emitted) warrant. The fan 140b and, perhaps, other components can be configured to deposit fluid between about 3 or fewer feet away and about 20 or greater feet away from the housing 105b.

Container

A variety of containers 110b may be used wherein each operate in a different manner. For example, the container 110b may be either a bag-on-valve (BoV) container or a non-BoV container. A BoV valve can spray in any orientation. Non-BoV valves fall into two types: vertical and tilt actuated valves. A vertical valve has a dip tube and is actuated by applying a downward force to the valve when the container is oriented in an upward direction (i.e., when the container is disposed vertically and the valve up disposed upwardly). The tilt valve is actuated by a sideways force to the valve. Yet another valve is a "spray any way" valve employing a flow valve that permits spraying at any position of the container, except when the container is oriented horizontally. The BoV system includes an aerosol valve attached to a bag. The formulation or product is placed inside the bag and a propellant fills the space between bag and can, and hence, a BoV container may be used for an environmentally-friendly purpose. When a button on the valve is pressed, the formulation inside the bag is dispensed with the aid of the pressurized/compressed propellant, which squeezes (i.e., applies pressure on) the bag. The propellant in the case of a BoV may be compressed air/nitrogen, thereby avoiding the use of hydrocarbons. As should be evident from the foregoing, in BoV systems, the propellant is separated from the formulation and does not affect the chemical characteristics of the formulation. Another feature of the BoV system is that the fluid dispensing device can be disposed and actuated at any angle. A still further feature of the BoV system is that the container may be a single predetermined size regardless of the fluid to be dispensed and instead the quantity of the formulation can be adjusted by choosing different size bags to be inserted into the container depending on the required usage or the application of the formulation.

Other types of non-BoV aerosol containers 110b may alternatively be used that are different from the BoV system in the sense that the propellant and the formulation are disposed together within the container. In such non-BoV systems, the propellant is usually a hydrocarbon substance. If desired, a different volatile substance could be used as a propellant, including an alcohol, such as isopropyl alcohol, ethanol, methanol, butyl alcohol, polyhydric alcohols, unsaturated aliphatic alcohols, acyclic alcohols, etc. and combinations thereof.

Such non-BoV pressurized containers 110b have the advantage that very small droplet sizes can be formed and emitted. Further, such containers do not exhibit a substantial decrease in pressure as the fluid is dispensed, as is experienced by BoV systems. It may be noted that some non-BoV systems that use an elongate dip tube inside the container must be maintained in substantially a vertical orientation as the contents are emitted so as to maintain the end of the dip tube in contact with the container contents. Otherwise, improper dispensing can result. However, other non-BoV systems do not use an internal elongate dip tube, and such containers incorporating such systems may be suitable for use in the device 100b.

In the device 100b, an adjustable mounting apparatus 275b may be attached to or incorporated within the housing 105b to accommodate different-sized containers. Also, the container 110b can be replaced by any other vessel that uses a pump to accomplish fluid flow.

Still further, the device 100b may utilize a container 110b containing an unpressurized or pressurized first fluid 137b that is fluidically coupled to a first inlet 340b of a nozzle 345b, as shown in FIG. 28. A second inlet 350b of the nozzle 345b receives pressured air or another pressurized second fluid, for example, as developed by a pump 355b, shown in FIG. 28. The first fluid 137b is provided to a chamber 360b of the nozzle 345b and the pressurized air or pressurized second fluid is introduced into the chamber 360b to shear the first fluid 137b into small droplets (perhaps in a range of 5 microns or smaller to about 60 microns or larger), which are emitted and entrained into the air flow induced by the fan 140b. Additionally, or alternatively, the first fluid 137b may be entrained into an air flow of the pressurized air from the pump 355b using another or different apparatus. In embodiments having an unpressurized container 110b, some other motivating force may propel the liquid 137b from the container 110b toward the first inlet 340b. This motivating force may be generated by the air pump 355b itself, for example, by providing a fluid communication channel from the pump 355b to a chamber defined by a piston located behind the contents of the container 110b and sealed to the walls thereof. The motivating force may be additionally or alternatively developed by gravity, and/or by developing a low pressure zone downstream of the container 110b, such as by a venturi.

Actuator

Dispensation of the fluid 137b of the container 110b is facilitated via the delivery mechanism such as the actuator 190b. The actuator 190b may include a button or a trigger or both. The actuator 190b may have a proprietary structure other than as described above such as a keyed arrangement requiring the container 110b and the actuator 190b to be keyed together for proper operation and ensuring that the droplets are emitted from the container 110b in the proper direction. The keyed arrangement may enhance child safety and may further prevent accidental discharge of formulation/ aerosol content from the container 110b when the container 110b is disengaged from the actuator 190b.

Still further, the actuator 190b and/or the housing 105b may be designed with an interlocking feature. For example, a user may be required to depress a button before the trigger 205b can be depressed to dispense a fluid. In this example, the user may be able to depress the button with one hand while depressing the trigger 205b with another hand, or both the button and the trigger 205b may be depressed by a user using the same hand. In any event, the use of an interlocking feature can improve safety by reducing accidental discharges of fluid.

Various control techniques may be implemented by mechanically, electromechanically, and/or electrically linking the actuator 190b with one or more other features. For example, one may interlock the actuator 190b with the fan 140b to provide, among other things, safer operation, a one-handed operation, a variable overall emission rate (implemented by a variable fluid dispensing rate from the container 110b or a variable fan speed, or both), and/or an intermittent or continuous operation of the fluid dispensing device 100b. For example, an interlocking feature may permit a user to depress the button, which in turn enables the user to depress the trigger 205b to cause fluid emission. Once the trigger 205b is pulled, the user can release the button, whereupon the button remains in the depressed condition, thereby allowing the user to squeeze the trigger 205b to continuously dispense fluid. The button remains in the depressed state until the trigger 205b is released, at which point the button returns to the non-depressed state. Thereafter, the user is required to depress the button again to depress the trigger 205b and resume dispensing of the fluid 137b. In another embodiment, it may be desired to provide for a continuous delivery of the fluid 137b without pulling the trigger 205b continuously. For example, the user may push the button one or more predetermined number of times to cause the trigger 205b to stay in a locked continuous delivery position without having the user's finger on the trigger 205b, thereby resulting in less hand fatigue for the user. Alternatively, it may be desired to limit the amount of time that the trigger 205b remains in a locked continuous delivery position by utilizing a timing mechanism interconnected with the actuator 190b and/or the controller or programmable element 226b such that the device 100b is deactivated after a predetermined time period. The foregoing control techniques or any other desired fluid dispensing device operational controls may be alternatively or additionally effected by the combination of the trigger 205b, the button, or any other activation mechanism as may be known in the art.

Droplet Size

Fine droplet sizes of the fluid 137b may be needed to achieve an efficacious result in certain applications, such as when spraying mosquitos. The combination of the actuator 190b, the fluid 137b (including the propellant in non-BoV systems), the type of container 110b, and the fan 140b contributes to the production and emission of fine droplet sizes of the fluid 137b in a range of about 5 microns or smaller to about 400 microns or larger. The desired or efficacious size of the droplets is dependent upon the desired result of the dispensing operation of the fluid dispensing device 100b. For example, it has been demonstrated that small droplet sizes are most efficacious for mosquito knockdown formulations. In an embodiment in which the device 100b is to be used to repel and kill mosquitos, the droplet sizes are advantageously in a range between about 5 microns or smaller and about 60 microns or larger.

Smaller droplet sizes may be more readily dispersed by the fan 140b than larger droplet sizes from the fluid dispensing device 100b. Understanding that most formulations include an active, a volatile solvent, and a carrier such as oil or water, it may be desirable to promote droplet size decay as the droplet is traveling through the device 100b. This reduction in droplet size may be effected by causing the solvent and/or the carrier to evaporate during such time. To that end, another component such as a heating element may be provided in the fluid dispensing device 100b. The heating element helps to accelerate an evaporation rate of a solvent in the formulation droplets. Another approach to reducing the size of the droplets is to provide alcohol and/or one or more other evaporative or volatile solvents as the solvent element in the formulation. As alcohol has a low boiling point, it evaporates more readily and rapidly as it encounters air flow from the fan and consequently the droplet size is reduced during projection and over a distance from the fluid dispensing device 100b, even without the use of a heating element. A further feature of the disclosed embodiments is that by projecting the droplets farther, they experience a longer hang time in the air before they descend onto a target area. This longer hang time provides more time for evaporation of non-active ingredients such as the solvent and/or carrier in the droplets and further reduces the droplet size as the remaining portion of the droplets is essentially discrete portions of the active ingredient of the fluid 137b.

Fluid Formulation

As part of the fluid 137b, ingredients such as colorants, fluorescent materials, or other similar substances may be provided to increase visibility of the fog or mist. Added colorant(s) in the fluid 137b further aid in aiming the projecting fluid 137b, for example, in low light conditions, and achieving proper coverage of a target area. Still further, a scent or a deodorant may be added. Some formulations of the liquid 137b and/or the liquids associated with the embodiments of FIGS. 1-7 may comprise pyrethrin, mineral oil and/or methyl oleate. The disclosures of U.S. patent application Ser. No. 14/748,933, filed Jun. 24, 2015, entitled "Insecticidal Composition" and U.S. patent application Ser. No. 13/220,458, filed Aug. 29, 2011, entitled "Insecticidal Compositions and Methods of Using the Same," both owned by Clarke Mosquito Control Products, Inc. are hereby incorporated by reference herein. The liquid 137b and the liquids associated with the embodiments of FIGS. 1-7 may comprise a composition disclosed in one or both of the above-mentioned U.S. Patent applications.

Rechargeable Battery

The rechargeable battery 325b allows the device 100b and operator to be untethered by wires, and other energy sources, such as gasoline, kerosene, and the like, are not involved. The rechargeable battery 325b may be lithium ion, nickel cadmium, or other suitable rechargeable batteries. A charging device with an AC/DC adapter for the rechargeable batteries 325b may be provided with the housing 105b of the fluid dispensing device 100b. In a further alternative embodiment, the fluid dispensing device 100b has a cord for plug-in use in the event that the batteries 325b are run down and fully discharged. In some of the embodiments of the fluid dispensing device 100b, a battery power indicator is included with the batteries to monitor a charge of the batteries in real time. The indicator may be a visual or an auditory indicator that provides the relative or absolute amount of power remaining in the battery (or batteries) 325b at a given time. In some other embodiments, the charging device may be integrated into a storage base for more convenient storage of the entire device 100b as well as better accessibility, and allow charging of the battery.

Combinational Use of a Circuit Board and Other Components

The controller or programmable element 226b together with one or more suitable sensors may be programmed and operable to sense and recognize an engagement of a specialized/customized type of container 110b with the actuator 190b and accordingly control the speed of the fan 140b and, as a result, control the projected distance and emission of the fluid 137b from the fluid dispensing device 100b. Specifically, each different fluid 137b may be associated with and identified with its own specific overcap 240b, or a conventional bar code or QR code or other indicia printed on the container 110b, by detecting a color and/or shape of an overcap 240b or other portion of the container 110b, or any other identifying apparatus or technique that may be carried by or associated with the container 110b. The controller or programmable element 226b can identify the type of container and thereby the associated formulation therein either separately or in combination with sensors such as a bar code reader, a QR reader, an electromechanical sensor, or one or more other suitable sensors. Once the type of the fluid 137b is identified, then the controller or programmable element 226b may permit or deny the engagement or operation of the container 110b with the actuator 190b. The controller or programmable element 226b may also set the fan speed and control other functions of the fluid dispensing device 100b based on the type of the fluid 137b being used.

The controller or programmable element 226b may pulse the fan and/or the introduction of the 137b fluid into the passage 120b. The pulsing feature optimizes battery life because the fan 140b is not energized and/or running continuously. Also, as the fluid 137b is pulsed in optimized amounts into the housing instead of being continuously fed in the housing, the run time (usage) of the fluid 137b is extended. Pulsing of the fluid 137b allows for a controlled quantity and targeted application of the fluid 137b onto a target.

A safety sensor such as an ultrasonic sensor, an optical sensor, or one or more other similar sensors known in the art may be provided in or on the fluid dispensing device 100b. When the safety sensor senses the presence of an object too close to the emission end 130b of the fluid dispensing device 100b, the sensor provides a signal to the circuit board 320 which either turns off the device 100b or prevents the fluid dispensing device 100b. This minimizes the probability of accidental spraying of people or animals.

Yet another embodiment comprehends a movement/position detector such as a gyroscope, an accelerometer, a GPS unit, and/or one or more other components known in the art that detect orientation or position. With this combination, the circuit board 320 and/or controller or programmable element 226b receive signals from the detector and can change the fan speed and/or control the operation of other components of the fluid dispensing device 100b depending on whether the fluid dispensing device 100b is pointing up, down, or horizontally and/or based on the position of the device 100b. In such situations the rate at which fluid is dispensed may be made dependent upon orientation and/or position of the device 100b. Thus, at appropriate orientations and/or locations, the fan speed may be reduced, thereby reducing the amount of the fluid 137b product being dispensed. As a consequence, conservation and optimization of use of the fluid 137b are realized. Another feature could be implemented wherein the device 100b is automatically shut off if the device is dropped or placed on the ground. If desired, the circuit board 320 may communicate via any known technology (e.g., Bluetooth or Wi-Fi) with a smartphone, a tablet, a computer, or the like to communicate data, such as device attitude and/or position, time and date of application, application rate, or any other data that might be used by a user or another to diagnose, treat, track, and/or fulfill application requirements.

INDUSTRIAL APPLICABILITY

The device 100, 200, and 100b is simple in design, inexpensive to produce and operate, and effective for a wide variety of applications. The various elements may be made of low cost materials, and application accuracy and operator safety are enhanced.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar references in the context of describing the invention (especially in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the disclosure and does not pose a limitation on the scope of the disclosure unless otherwise claimed. No language in the specification should be construed as indicating any non-claimed element as essential to the practice of the disclosure.

Numerous modifications to the present disclosure will be apparent to those skilled in the art in view of the foregoing description. It should be understood that the illustrated embodiments are exemplary only, and should not be taken as limiting the scope of the disclosure.

We claim:
1. A fluid dispensing device, comprising:
   a housing including an interior surface defining a passage extending at least between an emission end and at least one aperture configured to facilitate entry of a fluid into the passage, the housing further including a mounting apparatus adjacent and in contact with the aperture and adapted to receive a fluid source comprising an aerosol spray container such that the fluid passes through the mounting apparatus and the aperture into the passage; and
   a fluid moving device associated with the housing and operable to develop air flow in the passage, wherein the aperture is disposed downstream of the fluid moving device and upstream of the emission end.
2. The fluid dispensing device of claim 1, wherein the fluid source is secured to the mounting apparatus.
3. The fluid dispensing device of claim 1, wherein the interior surface of the device housing is substantially cylindrical.

4. The fluid dispensing device of claim 1, wherein the aperture is disposed at a bottom portion of the interior surface and the fluid dispensing device further comprises a shield section disposed adjacent the emission end of the interior surface wherein a top portion of the shield section comprises a protruding member.

5. The fluid dispensing device of claim 1, further comprising at least one light source configured to provide light to an application region.

6. The fluid dispensing device of claim 1, further comprising a circuit board in communication with the fluid moving device and at least one light source.

7. A fluid dispensing device, comprising:
a housing including an interior surface defining a passage extending at least between an emission end and at least one aperture configured to facilitate entry of a fluid into the passage, the housing further including a mounting apparatus adjacent and in contact with the aperture and adapted to receive a fluid source such that the fluid passes through the mounting apparatus and the aperture into the passage; and
a fluid moving device associated with the housing and operable to develop air flow in the passage, wherein the aperture is disposed downstream of the fluid moving device and upstream of the emission end, wherein at least one vane is disposed between the fluid moving device and the aperture, and wherein the at least one vane comprises a first portion substantially parallel with a rotational axis of the fluid moving device and a second portion that is at least one of curved and disposed at a non-zero angle relative to the rotational axis.

8. The fluid dispensing device of claim 7, wherein the interior surface of the housing encloses at least one guiding member disposed downstream of the fluid moving device.

9. The fluid dispensing device of claim 7, wherein the fluid source comprises a source of pressurized fluid.

10. A fluid dispensing device, comprising:
a housing including an interior surface defining a passage extending at least between an emission end and at least one aperture configured to facilitate entry of a fluid into the passage, the housing further including a mounting apparatus adjacent and in contact with the aperture and adapted to receive a fluid source such that the fluid passes through the mounting apparatus and the aperture into the passage; and
a fluid moving device associated with the housing and operable to develop air flow in the passage, wherein the aperture is disposed downstream of the fluid moving device and upstream of the emission end,
wherein the interior surface of the device housing encloses at least one guiding member disposed downstream of the fluid moving device, the guiding member comprising an outer surface having substantially frustoconical shape having a diameter that decreases toward the emission end.

11. The fluid dispensing device of claim 10, wherein the fluid source is secured to the mounting apparatus.

12. The fluid dispensing device of claim 10, wherein the aperture is disposed at a bottom portion of the interior surface and the fluid dispensing device further comprises a shield section disposed adjacent the emission end of the interior surface wherein a top portion of the shield section comprises a protruding member.

13. A fluid dispensing device, comprising:
a housing including an interior surface defining a passage extending at least between an emission end and at least one aperture configured to facilitate entry of a fluid into the passage, the housing further including a mounting apparatus adjacent and in contact with the aperture and adapted to receive a fluid source such that the fluid passes through the mounting apparatus and the aperture into the passage; and
a fluid moving device associated with the housing and operable to develop air flow in the passage, wherein the aperture is disposed downstream of the fluid moving device and upstream of the emission end,
wherein the fluid source is a container comprising:
a container housing;
a button atop the container housing;
an overcap at least partially enclosing the button, the overcap comprising an orifice to allow flow of the fluid, an aperture for facilitating actuation of the button, and a projecting member; and
a fitting member disposed at least partially circumferentially about the container.

14. The fluid dispensing device of claim 13, wherein the interior surface of the device housing is substantially cylindrical and the container housing comprises a substantially cylindrical portion, wherein a central longitudinal axis of the substantially cylindrical portion is less than 45 degrees from perpendicular to the central longitudinal axis of the interior surface.

15. The fluid dispensing device of claim 13, wherein the interior surface of the device housing is substantially cylindrical, the orifice faces the emission end, and the projecting member faces a direction opposite the orifice.

16. The fluid dispensing device of claim 15, wherein the aperture of the overcap is longer in a direction parallel to the central longitudinal axis of the interior surface than in a direction perpendicular to the central longitudinal axis of the interior surface.

17. A fluid dispensing device, comprising:
a housing including an interior surface defining a passage extending at least between an emission end and at least one aperture configured to facilitate entry of a fluid into the passage, the housing further including a mounting apparatus adjacent and in contact with the aperture and adapted to receive a fluid source such that the fluid passes through the mounting apparatus and the aperture into the passage; and
a fluid moving device associated with the housing and operable to develop air flow in the passage, wherein the aperture is disposed downstream of the fluid moving device and upstream of the emission end; and
a rechargeable battery at least partially enclosed by the housing.

18. The fluid dispensing device of claim 17, wherein the interior surface surrounds at least one vane disposed between the fluid moving device and the aperture.

* * * * *